United States Patent  
Ozturk et al.

(10) Patent No.: US 12,075,289 B2
(45) Date of Patent: Aug. 27, 2024

(54) TECHNIQUES AND APPARATUSES FOR USER EQUIPMENT MOBILITY IN MULTI-CONNECTIVITY MODE

(71) Applicant: QUALCOMM Incorporated, San Diego, CA (US)

(72) Inventors: Ozcan Ozturk, San Diego, CA (US); Huichun Liu, San Diego, CA (US); Xipeng Zhu, San Diego, CA (US); Gavin Bernard Horn, La Jolla, CA (US); Luis Fernando Brisson Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/178,624

(22) Filed: Mar. 6, 2023

(65) Prior Publication Data

US 2023/0209415 A1    Jun. 29, 2023

Related U.S. Application Data

(63) Continuation of application No. 16/615,105, filed as application No. PCT/CN2018/091154 on Jun. 13, 2018, now Pat. No. 11,606,729.

(30) Foreign Application Priority Data

Jun. 15, 2017  (WO) ................ PCT/CN2017/088378
Jun. 15, 2017  (WO) ................ PCT/CN2017/088404

(51) Int. Cl.
H04W 36/00    (2009.01)
H04W 36/08    (2009.01)
(Continued)

(52) U.S. Cl.
CPC ... *H04W 36/0027* (2013.01); *H04W 36/0016* (2013.01); *H04W 36/0033* (2013.01);
(Continued)

(58) Field of Classification Search
CPC ......... H04W 36/0027; H04W 36/0016; H04W 36/0033; H04W 36/08; H04W 36/0069;
(Continued)

(56) References Cited

U.S. PATENT DOCUMENTS 9,609,602 B2    3/2017  Jain et al.
10,477,611 B2   11/2019 Chang et al.
(Continued)

FOREIGN PATENT DOCUMENTS

CN    104106302 A    10/2014
CN    104145503 A    11/2014
(Continued)

OTHER PUBLICATIONS

3GPP TR 38.804: "3rd Generation Partnership Project, Technical Specification Group Radio Access Network, Study on New Radio Access Network, Study on New Radio Access Technology, Radio Interface Protocol Aspects (Release 14)", 3GPP TR 38.804, 3rd Generation Partnership Project, Mobile Competence Centre, 650, Route Des Lucioles, F-06921 Sophia-Antipolis Cedex, France, vol. RAN WG2, No. V14.0.0, Mar. 24, 2017, XP051297619, pp. 1-57, Paragraph 4,5 and Paragraph 10.2., Abstract, URL:, p. 1-2,8-10,18-19,29-30,39.
(Continued)

*Primary Examiner* — Chi H Pham
*Assistant Examiner* — Vladislav Y Agureyev
(74) *Attorney, Agent, or Firm* — Harrity & Harrity LLP /Qualcomm Incorporated

(57) ABSTRACT

Certain aspects of the present disclosure generally relate to wireless communication. In some aspects, a user equipment
(Continued)

may select at least one target node for a radio resource control connection, wherein the user equipment is in a particular radio resource control communication state when the at least one target node is selected, and wherein the user equipment is configured to communicate using dual-connectivity, wherein context information associated with the user equipment is stored by the user equipment, a master node associated with the user equipment, and a secondary node associated with the user equipment based at least in part on the user equipment being in the particular radio resource control communication state; and/or transmit information to the at least one target node or the master node to cause the context information to be provided to the at least one target node. Numerous other aspects are provided.

20 Claims, 24 Drawing Sheets

(51) Int. Cl.
*H04W 76/27* (2018.01)
*H04W 76/34* (2018.01)
*H04W 92/20* (2009.01)

(52) U.S. Cl.
CPC .......... *H04W 36/08* (2013.01); *H04W 76/27* (2018.02); *H04W 76/34* (2018.02); *H04W 92/20* (2013.01)

(58) Field of Classification Search
CPC ..... H04W 88/06; H04W 76/15; H04W 76/27; H04W 76/34; H04W 92/20
See application file for complete search history.

(56) References Cited

U.S. PATENT DOCUMENTS

| | | | |
|---|---|---|---|
| 10,798,619 B2 | 10/2020 | Nigam et al. | |
| 10,917,786 B2* | 2/2021 | Ryoo | H04W 52/0229 |
| 11,330,663 B2 | 5/2022 | Park et al. | |
| 11,641,689 B2 | 5/2023 | Rugeland et al. | |
| 11,706,616 B2 | 7/2023 | Shih et al. | |
| 11,711,739 B2* | 7/2023 | Säily | H04W 52/0209 |
| | | | 370/331 |
| 11,723,106 B2* | 8/2023 | Deenoo | H04W 76/11 |
| | | | 370/329 |
| 11,737,165 B2 | 8/2023 | Teyeb et al. | |
| 2012/0236776 A1 | 9/2012 | Zhang et al. | |
| 2014/0056243 A1 | 2/2014 | Pelletier et al. | |
| 2015/0105039 A1 | 4/2015 | Takahashi et al. | |
| 2015/0223282 A1 | 8/2015 | Vajapeyam et al. | |
| 2016/0234728 A1 | 8/2016 | Fan et al. | |
| 2016/0242128 A1 | 8/2016 | Loehr et al. | |
| 2016/0309379 A1* | 10/2016 | Pelletier | H04W 76/15 |
| 2017/0019866 A1 | 1/2017 | Malkamaki et al. | |
| 2017/0041880 A1 | 2/2017 | Ouchi et al. | |
| 2017/0055187 A1 | 2/2017 | Kang et al. | |
| 2017/0071023 A1 | 3/2017 | Kunz et al. | |
| 2017/0127362 A1 | 5/2017 | Tavildar et al. | |
| 2017/0311278 A1* | 10/2017 | Adjakple | H04W 60/04 |
| 2018/0110082 A1 | 4/2018 | Saily et al. | |
| 2018/0115928 A1 | 4/2018 | Kim et al. | |
| 2018/0176710 A1 | 6/2018 | Jang et al. | |
| 2018/0176834 A1* | 6/2018 | Wei | H04W 36/0066 |
| 2018/0199245 A1 | 7/2018 | Futaki et al. | |
| 2018/0199398 A1 | 7/2018 | Dao et al. | |
| 2018/0220483 A1 | 8/2018 | Hayashi | |
| 2018/0220486 A1* | 8/2018 | Tseng | H04W 36/305 |
| 2018/0227819 A1 | 8/2018 | Lee et al. | |
| 2018/0234838 A1 | 8/2018 | Mildh et al. | |
| 2018/0234890 A1 | 8/2018 | Shih et al. | |
| 2018/0270682 A1 | 9/2018 | Zacharias et al. | |
| 2018/0270713 A1 | 9/2018 | Park et al. | |
| 2018/0270791 A1* | 9/2018 | Park | H04W 8/24 |
| 2018/0270792 A1* | 9/2018 | Park | H04W 68/025 |
| 2018/0270894 A1* | 9/2018 | Park | H04W 36/02 |
| 2018/0270895 A1 | 9/2018 | Park et al. | |
| 2018/0279218 A1 | 9/2018 | Park et al. | |
| 2018/0295544 A1 | 10/2018 | Feng | |
| 2018/0295670 A1 | 10/2018 | Decarreau et al. | |
| 2018/0302834 A1 | 10/2018 | Zhang et al. | |
| 2018/0352482 A1 | 12/2018 | Gage et al. | |
| 2018/0352491 A1 | 12/2018 | Shih et al. | |
| 2018/0359299 A1 | 12/2018 | Chou | |
| 2019/0037453 A1 | 1/2019 | Wang et al. | |
| 2019/0037459 A1 | 1/2019 | Pelletier et al. | |
| 2019/0045564 A1 | 2/2019 | Hayashi | |
| 2019/0059031 A1 | 2/2019 | Hahn et al. | |
| 2019/0124566 A1 | 4/2019 | Liu et al. | |
| 2019/0166559 A1 | 5/2019 | Chen et al. | |
| 2019/0174571 A1 | 6/2019 | Deenoo et al. | |
| 2019/0208474 A1* | 7/2019 | Ali | H04W 84/20 |
| 2019/0230536 A1 | 7/2019 | Da Silva et al. | |
| 2019/0230731 A1* | 7/2019 | Park | H04W 76/27 |
| 2019/0261312 A1 | 8/2019 | Du et al. | |
| 2019/0289510 A1 | 9/2019 | Rugeland et al. | |
| 2019/0297663 A1 | 9/2019 | Nord et al. | |
| 2019/0335421 A1* | 10/2019 | Park | H04W 8/24 |
| 2019/0373520 A1 | 12/2019 | Sillanpaa | |
| 2019/0394792 A1 | 12/2019 | Jeon et al. | |
| 2020/0022043 A1 | 1/2020 | Pelletier et al. | |
| 2020/0128455 A1 | 4/2020 | Da Silva et al. | |
| 2020/0154326 A1 | 5/2020 | Deenoo et al. | |
| 2020/0169922 A1 | 5/2020 | Ozturk | |
| 2020/0196232 A1 | 6/2020 | Drevo et al. | |
| 2021/0204355 A1 | 7/2021 | Teyeb et al. | |
| 2021/0337442 A1 | 10/2021 | Da Silva | |
| 2022/0159533 A1 | 5/2022 | Sharma et al. | |
| 2023/0345574 A1* | 10/2023 | Deenoo | H04W 76/28 |

FOREIGN PATENT DOCUMENTS

| | | | |
|---|---|---|---|
| CN | 105792256 A | 7/2016 | |
| CN | 106664644 A | 5/2017 | |
| EP | 3078237 A1 | 10/2016 | |
| EP | 3370453 A1 | 9/2018 | |
| EP | 3445127 B1 | 11/2020 | |
| EP | 3902318 A1 * | 10/2021 | ............ H04W 24/02 |
| EP | 3927017 A1 | 12/2021 | |
| WO | 2009021614 A1 | 2/2009 | |
| WO | 2015081324 A1 | 6/2015 | |
| WO | 2015085273 A1 | 6/2015 | |
| WO | 2016163544 A1 | 10/2016 | |
| WO | 2016167212 A1 | 10/2016 | |
| WO | WO-2018151546 A1 * | 8/2018 | |
| WO | 2018172596 A1 | 9/2018 | |
| WO | 2018184656 A1 | 10/2018 | |

OTHER PUBLICATIONS

Dasilva I.L., et al., "A Novel State Model for 5G Radio Access Networks", May 23-27, 2016, 2016 IEEE International Conference on Communications Workshops (ICC), pp. 1-6.
ETSI TR 138 912, V14.0.0, "3rd Generation Partnership Project; Technical Specification Group Radio Access Network; Study on New Radio (NR) Access Technology (Release 14)", 3GPP Standard, Technical Specification, 3GPP TR 38.912, 3rd Generation Partnership Project (3GPP), Mobile Competence Centre, 650, Route Des Lucioles, F-06921 Sophia-Antipolis Cedex, France, vol. TSG RAN, No. V14.0.0, Mar. 24, 2017 (Mar. 24, 2017), XP051295707, 77 pages, Abstract.
Huawei: "Introduction of Light Connection", 3GPP TSG-RAN WG3 Meeting #93, 3GPP Draft; R3-161723, 36300CR for Light Connection, 3rd Generation Partnership Project (3GPP), Mobile Competence Centre; 650, Route Des Lucioles; F-06921 Sophia-Antipolis Cedex; France, vol. RAN WG3, No. Gothenburg, Sweden; Aug. 22, 2016-Aug. 26, 2016, Aug. 21, 2016 (Aug. 21, 2016), XP051127558, 4 pages, Abstract.
Huawei., "Procedures for secondarynode change," 3GPP TSG-RAN WG3 #95bis, R3-171257, Apr. 7, 2017, pp. 1-3.

(56) References Cited

OTHER PUBLICATIONS

International Preliminary Report on Patentability—PCT/CN2017/088378, The International Bureau of WIPO—Geneva, Switzerland, dated Dec. 26, 2019.
International Preliminary Report on Patentability—PCT/CN2018/091154, The International Bureau of WIPO—Geneva, Switzerland, dated Dec. 26, 2019.
International Search Report and Written Opinion—PCT/CN2017/088378—ISA/EPO—dated Feb. 26, 2018.
International Search Report and Written Opinion—PCT/CN2018/091154—ISA/EPO—dated Sep. 19, 2018.
LG Electronics Inc., "Discussion onSecondary Node Change Procedures," 3GPP TSG-RAN WG3 # 96, R3-171440, May 19, 2017, pp. 1-4.
Supplementary Partial European Search Report—EP18818755—Search Authority—Munich—dated Feb. 16, 2021.
CATT: "Inactive state and support of CA, DC and inter-RAT mobility", 3GPP TSG RAN WG2 Meeting #95bis, R2-166117, Kaohsiung, Oct. 10-14, 2016, Dec. 1, 2016, 2 Pages.

\* cited by examiner

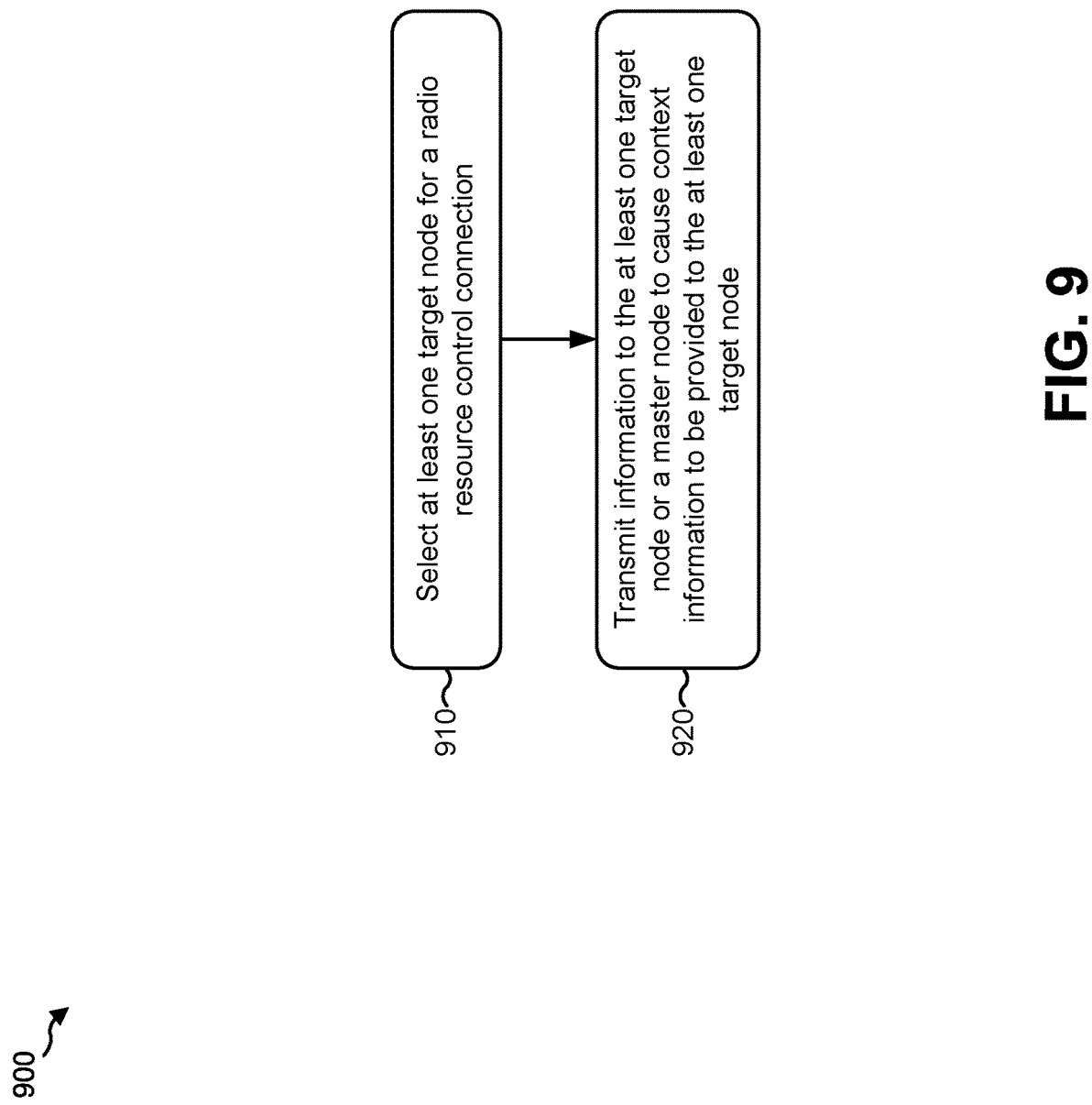

TECHNIQUES AND APPARATUSES FOR USER EQUIPMENT MOBILITY IN MULTI-CONNECTIVITY MODE

CROSS-REFERENCE TO RELATED APPLICATIONS

This application is a continuation of U.S. patent application Ser. No. 16/615,105, filed Nov. 19, 2019, entitled "TECHNIQUES AND APPARATUSES FOR USER EQUIPMENT MOBILITY IN MULTI-CONNECTIVITY MODE," which is a 371 national stage of International Application No. PCT/CN2018/091154 filed on Jun. 13, 2018, entitled "TECHNIQUES AND APPARATUSES FOR USER EQUIPMENT MOBILITY IN MULTI-CONNECTIVITY MODE," which claims priority to PCT Application No. PCT/CN2017/088378 filed on Jun. 15, 2017, entitled "TECHNIQUES AND APPARATUSES FOR USER EQUIPMENT MOBILITY IN DUAL-CONNECTIVITY MODE," and PCT Application No. PCT/CN2017/088404 filed on Jun. 15, 2017, entitled "TECHNIQUES AND APPARATUSES FOR DUAL-CONNECTIVITY MODE SECONDARY CELL GROUP CONFIGURATION," the contents of which are incorporated herein by reference in their entireties.

FIELD OF THE DISCLOSURE

Aspects of the present disclosure generally relate to wireless communication, and more particularly to techniques and apparatuses for user equipment (UE) mobility in a multi-connectivity mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may include transitioning, when using a multi-connectivity mode for communication with a master node and a secondary node, from an active state to an inactive state, wherein the inactive state is different from the active state of the multi-connectivity mode, an idle state of the multi-connectivity mode, and a sleep state of the multi-connectivity mode. The method may include storing, when operating in the inactive state of the multi-connectivity mode, context information related to a bearer configuration at the secondary node.

In some aspects, a user equipment may include a memory coupled to one or more processors. The memory and the one or more processors may be configured to transition, when using a multi-connectivity mode for communication with a master node and a secondary node, from an active state to an inactive state, wherein the inactive state is different from the active state of the multi-connectivity mode, an idle state of the multi-connectivity mode, and a sleep state of the multi-connectivity mode. The memory and the one or more processors may be configured to store, when operating in the inactive state of the multi-connectivity mode, context information related to a bearer configuration at the secondary node.

In some aspects, a non-transitory computer-readable medium may store one or more instructions for wireless communication. The one or more instructions, when executed by one or more processors of a user equipment, may cause the one or more processors to transition, when using a multi-connectivity mode for communication with a master node and a secondary node, from an active state to an inactive state, wherein the inactive state is different from the active state of the multi-connectivity mode, an idle state of the multi-connectivity mode, and a sleep state of the multi-connectivity mode. The one or more instructions, when executed by the one or more processors of the user equipment, may cause the one or more processors to store, when operating in the inactive state of the multi-connectivity mode, context information related to a bearer configuration at the secondary node.

In some aspects, an apparatus for wireless communication may include means for transitioning, when using a multi-connectivity mode for communication with a master node and a secondary node, from an active state to an inactive state, wherein the inactive state is different from the active state of the multi-connectivity mode, an idle state of the multi-connectivity mode, and a sleep state of the multi-connectivity mode. The apparatus may include means for storing, when operating in the inactive state of the multi-connectivity mode, context information related to a bearer configuration at the secondary node.

In some aspects, a method for wireless communication may include receiving, from a user equipment associated with a multi-connectivity configuration, information relating to the user equipment resuming a radio resource control connection with a wireless network, wherein the user equipment is associated with an inactive state during which the first node stores multi-connectivity context information relating to the user equipment, and wherein the radio resource control connection is associated with the first node and at least one of a target master node or a target secondary node. The method may include providing the context information, relating to the user equipment, to at least one of the target master node or the target secondary node for establishment of another connection.

In some aspects, a first node may include a memory coupled to one or more processors. The memory and the one or more processors may be configured to receive, from a user equipment associated with a multi-connectivity configuration, information relating to the user equipment resuming a radio resource control connection with a wireless network, wherein the user equipment is associated with an inactive state during which the first node stores multi-connectivity context information relating to the user equipment, and wherein the radio resource control connection is associated with the first node and at least one of a target master node or a target secondary node. The memory and the one or more processors may be configured to provide the context information, relating to the user equipment, to at least one of the target master node or the target secondary node for establishment of another connection.

In some aspects, a non-transitory computer-readable medium may store one or more instructions for wireless communication. The one or more instructions, when executed by one or more processors of a first node, may cause the one or more processors to receive, from a user equipment associated with a multi-connectivity configuration, information relating to the user equipment resuming a radio resource control connection with a wireless network, wherein the user equipment is associated with an inactive state during which the first node stores multi-connectivity context information relating to the user equipment, and wherein the radio resource control connection is associated with the first node and at least one of a target master node or a target secondary node. The one or more instructions, when executed by the one or more processors of the first node, may cause the one or more processors to provide the context information, relating to the user equipment, to at least one of the target master node or the target secondary node for establishment of another connection.

In some aspects, an apparatus for wireless communication may include means for receiving, from a user equipment associated with a multi-connectivity configuration, information relating to the user equipment resuming a radio resource control connection with a wireless network, wherein the user equipment is associated with an inactive state during which the first node stores multi-connectivity context information relating to the user equipment, and wherein the radio resource control connection is associated with the first node and at least one of a target master node or a target secondary node. The apparatus may include means for providing the context information, relating to the user equipment, to at least one of the target master node or the target secondary node for establishment of another connection.

In some aspects, a method for wireless communication may include transmitting a communication to reconfigure a secondary cell group (SCG) bearer associated with a second node and a user equipment in a multi-connectivity mode in connection with transitioning the user equipment to an inactive state, wherein the second node is configured to store a user equipment context relating to the second node in connection with the user equipment operating in the inactive state. The method may include receiving, from the second node, an indication of downlink data for the user equipment based at least in part on configuration or reconfiguration of the SCG bearer.

In some aspects, a first node may include a memory coupled to one or more processors. The memory and the one or more processors may be configured to transmit a communication to reconfigure a secondary cell group (SCG) bearer associated with a second node and a user equipment in a multi-connectivity mode in connection with transitioning the user equipment to an inactive state, wherein the second node is configured to store a user equipment context relating to the second node in connection with the user equipment operating in the inactive state. The memory and the one or more processors may be configured to receive, from the second node, an indication of downlink data for the user equipment based at least in part on configuration or reconfiguration of the SCG bearer.

In some aspects, a non-transitory computer-readable medium may store one or more instructions for wireless communication. The one or more instructions, when executed by one or more processors of a first node, may cause the one or more processors to transmit a communication to reconfigure a secondary cell group (SCG) bearer associated with a second node and a user equipment in a multi-connectivity mode in connection with transitioning the user equipment to an inactive state, wherein the second node is configured to store a user equipment context relating to the second node in connection with the user equipment operating in the inactive state. The one or more instructions, when executed by the one or more processors of the first node, may cause the one or more processors to receive, from the second node, an indication of downlink data for the user equipment based at least in part on configuration or reconfiguration of the SCG bearer.

In some aspects, an apparatus for wireless communication may include means for transmitting a communication to reconfigure a secondary cell group (SCG) bearer associated with a second node and a user equipment in a multi-connectivity mode in connection with transitioning the user equipment to an inactive state, wherein the second node is configured to store a user equipment context relating to the second node in connection with the user equipment operating in the inactive state. The apparatus may include means for receiving, from the second node, an indication of downlink data for the user equipment based at least in part on configuration or reconfiguration of the SCG bearer.

In some aspects, a method for wireless communication may include transitioning, based at least in part on an instruction from a first node, from an active state to an inactive state, wherein the user equipment is connected to a second node using a secondary cell group (SCG) bearer in a multi-connectivity mode, and wherein the user equipment stores a user equipment context and controls mobility in the inactive state. The method may include receiving, based at least in part on receiving paging from the first node triggered by downlink data being received at the second node, the downlink data from the first node or a third node.

In some aspects, a user equipment may include a memory coupled to one or more processors. The memory and the one or more processors may be configured to transition, based at least in part on an instruction from a first node, from an active state to an inactive state, wherein the user equipment is connected to a second node using a secondary cell group (SCG) bearer in a multi-connectivity mode, and wherein the user equipment stores a user equipment context and controls mobility in the inactive state. The memory and the one or more processors may be configured to receive, based at least in part on receiving paging from the first node triggered by downlink data being received at the second node, the downlink data from the first node or a third node.

In some aspects, a non-transitory computer-readable medium may store one or more instructions for wireless communication. The one or more instructions, when executed by one or more processors of a user equipment, may cause the one or more processors to transition, based at least in part on an instruction from a first node, from an active state to an inactive state, wherein the user equipment is connected to a second node using a secondary cell group (SCG) bearer in a multi-connectivity mode, and wherein the user equipment stores a user equipment context and controls mobility in the inactive state. The one or more instructions, when executed by the one or more processors of the user equipment, may cause the one or more processors to receive, based at least in part on receiving paging from the first node triggered by downlink data being received at the second node, the downlink data from the first node or a third node.

In some aspects, an apparatus for wireless communication may include means for transitioning, based at least in part on an instruction from a first node, from an active state to an inactive state, wherein the user equipment is connected to a second node using a secondary cell group (SCG) bearer in a multi-connectivity mode, and wherein the user equipment stores a user equipment context and controls mobility in the inactive state. The apparatus may include means for receiving, based at least in part on receiving paging from the first node triggered by downlink data being received at the second node, the downlink data from the first node or a third node.

Aspects generally include a method, apparatus, system, computer program product, non-transitory computer-readable medium, user equipment, wireless communication device, node, base station, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a user equipment, in accordance with various aspects of the present disclosure.

DETAILED DESCRIPTION

Figure 1:
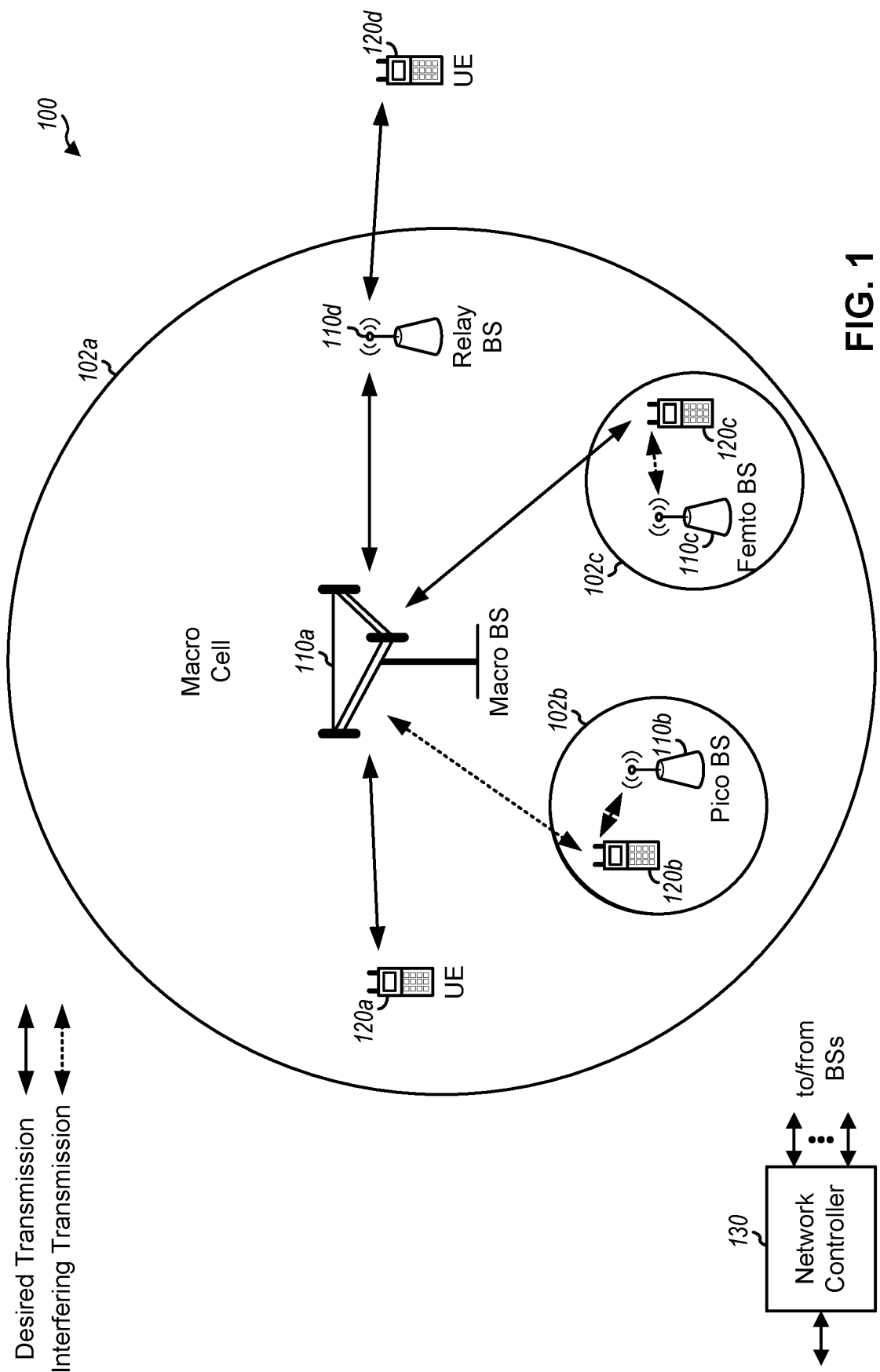
FIG. 1 is a block diagram conceptually illustrating an example of a wireless communication network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect. Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing that houses components of UE 120, such as processor components, memory components, and/or the like.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
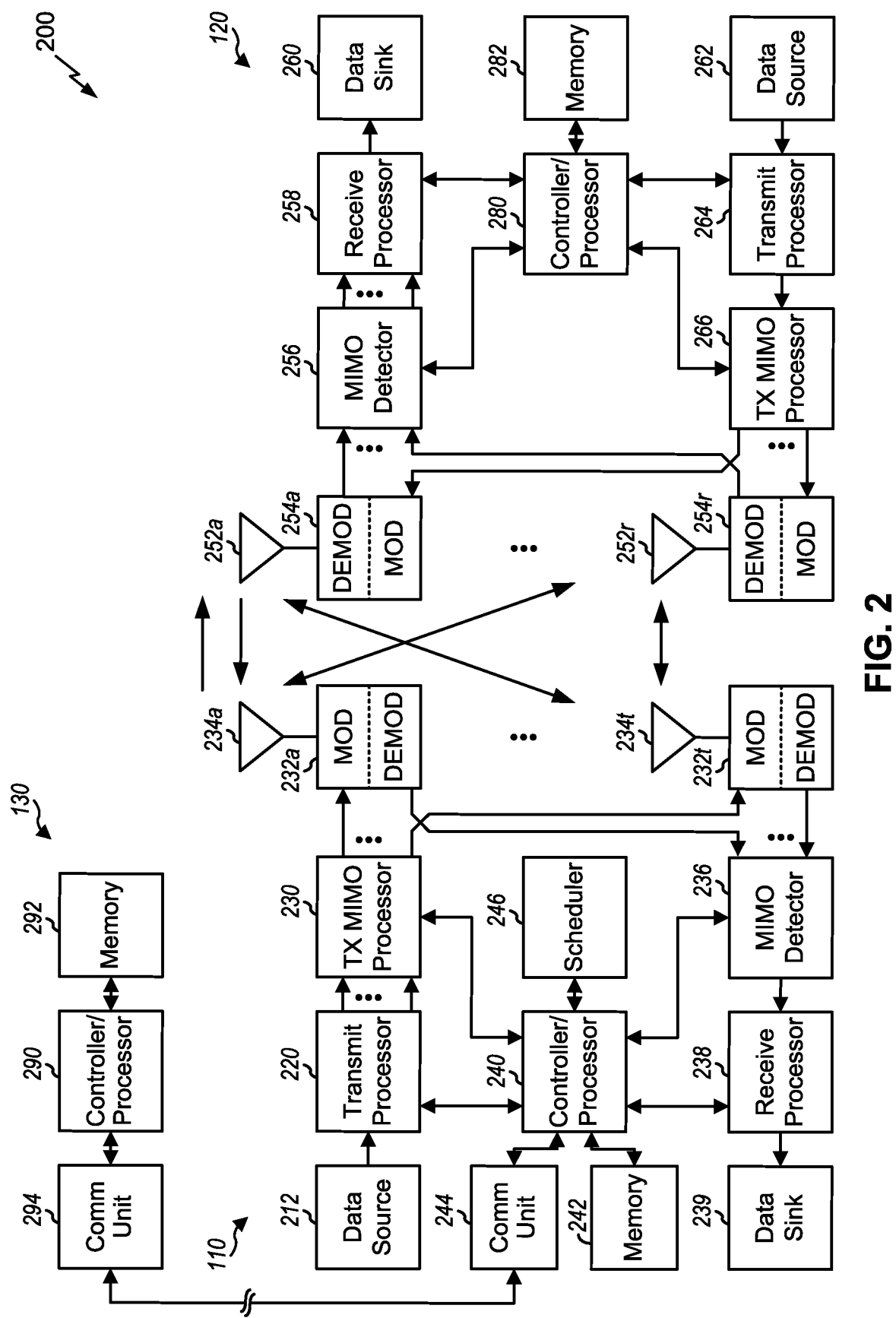
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292. In some aspects, one or more components of UE 120 may be included in a housing.

Controller/processor 240 of base station 110, controller/processor 280 of UE 120, and/or any other component(s) of FIG. 2 may perform one or more techniques associated with mobility in a multi-connectivity mode, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1300 of FIG. 13, process 1400 of FIG. 14, process 1500 of FIG. 15, process 1600 of FIG. 16, process 1700 of FIG. 17, process 1800 of FIG. 18, and/or other processes as described herein. Memories 242 and 282 may store data and program codes for base station 110 and UE 120, respectively. A scheduler 246 may schedule UEs for data transmission on the downlink and/or uplink.

In some aspects, UE 120 and/or base station 110 may include means for transitioning, when using a multi-connectivity mode for communication with a master node and a secondary node, from an active state to an inactive state, wherein the inactive state is different from the active state of the multi-connectivity mode, an idle state of the multi-connectivity mode, and a sleep state of the multi-connectivity mode; means for storing, when operating in the inactive state of the multi-connectivity mode, context information related to a bearer configuration at the secondary node; and/or the like. In some aspects, such means may include one or more components of UE 120 and/or base station 110 described in connection with FIG. 2.

In some aspects, UE 120 and/or base station 110 may include means for receiving, from a user equipment associated with a multi-connectivity configuration, information relating to the user equipment resuming a radio resource control connection with a wireless network, wherein the user equipment is associated with an inactive state during which the first node stores multi-connectivity context information relating to the user equipment, and wherein the radio resource control connection is associated with the first node and at least one of a target master node or a target secondary node; means for providing the context information, relating to the user equipment, to at least one of the target master node or the target secondary node for establishment of another connection; and/or the like. In some aspects, such means may include one or more components of UE 120 and/or base station 110 described in connection with FIG. 2.

In some aspects, UE 120 and/or base station 110 may include means for transmitting a communication to reconfigure a secondary cell group (SCG) bearer associated with a second node and a user equipment in a multi-connectivity mode in connection with transitioning the user equipment to an inactive state, wherein the second node is configured to store a user equipment context relating to the second node in connection with the user equipment operating in the inactive state; means for receiving, from the second node, an indication of downlink data for the user equipment based at least in part on configuration or reconfiguration of the SCG bearer; and/or the like. In some aspects, such means may include one or more components of UE 120 and/or base station 110 described in connection with FIG. 2.

In some aspects, UE 120 and/or base station 110 may include means for transitioning, based at least in part on an instruction from a first node, from an active state to an inactive state, wherein the user equipment is connected to a second node using a secondary cell group (SCG) bearer in a multi-connectivity mode, and wherein the user equipment stores a user equipment context and controls mobility in the inactive state; means for receiving, based at least in part on receiving paging from the first node triggered by downlink data being received at the second node, the downlink data from the first node or a third node; and/or the like. In some aspects, such means may include one or more components of UE 120 and/or base station 110 described in connection with FIG. 2.

As indicated above, FIG. 2 is provided merely as an example. Other examples are possible and may differ from what was described with regard to FIG. 2.

Figure 3:
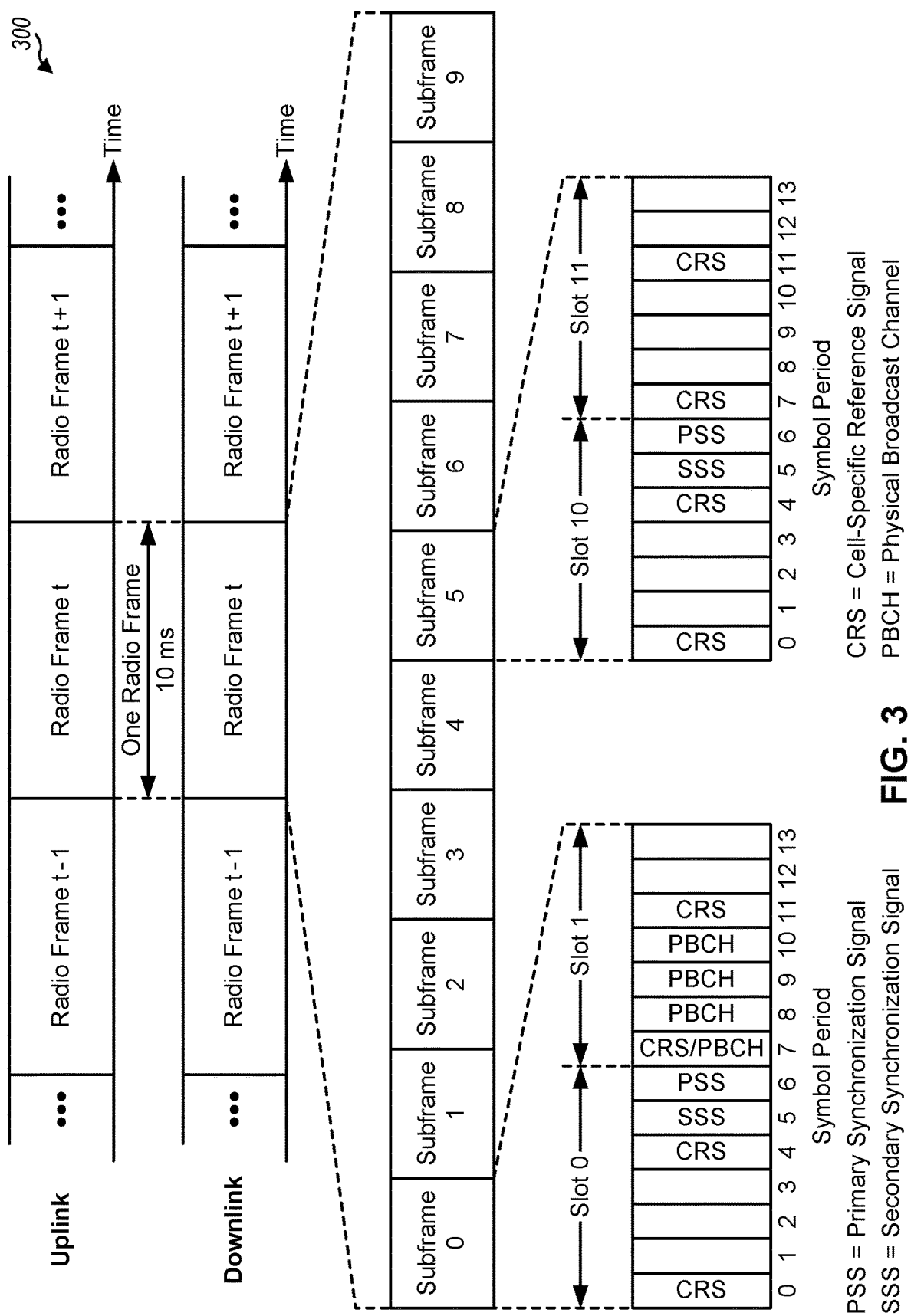
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
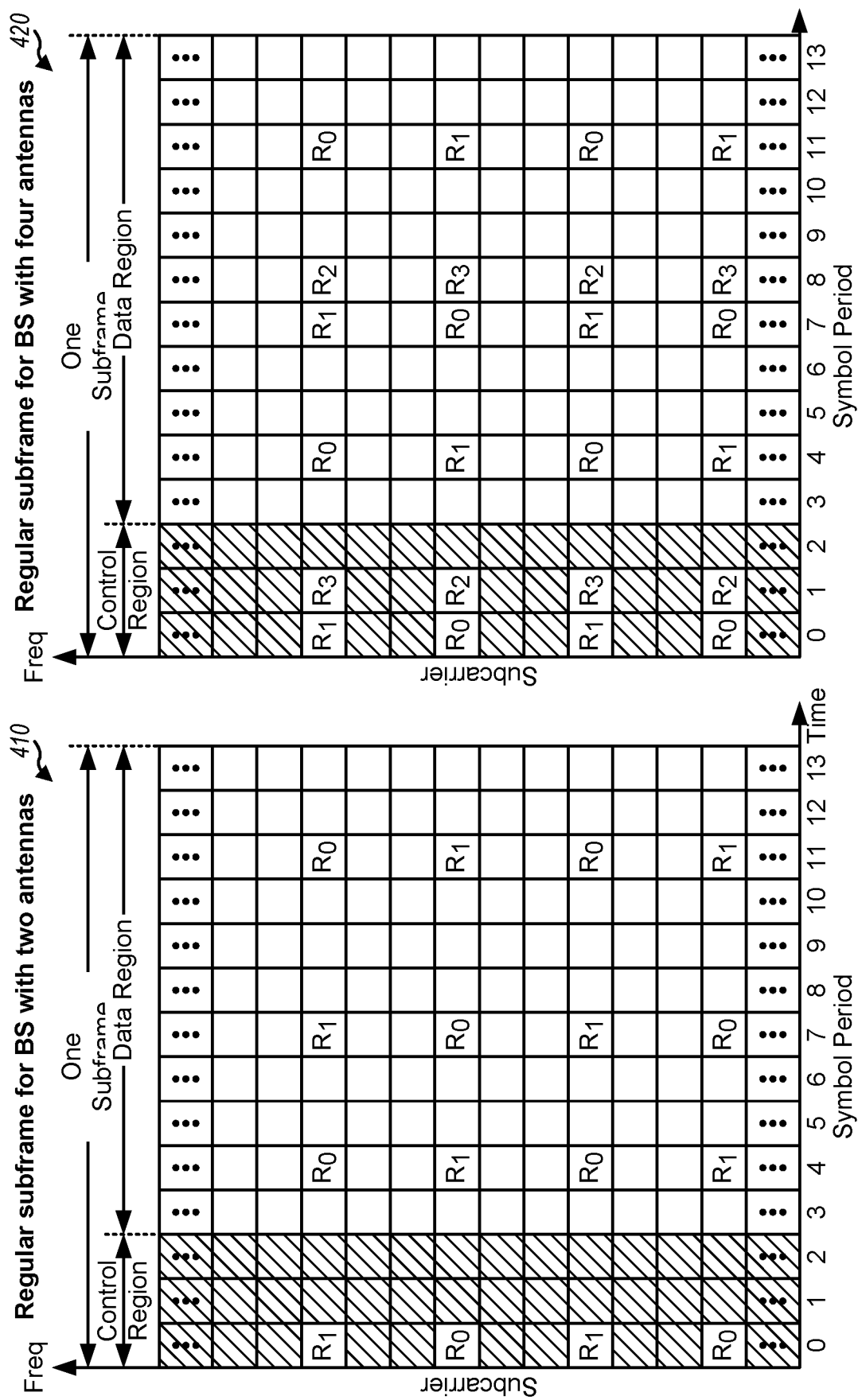
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BS s.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual-connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
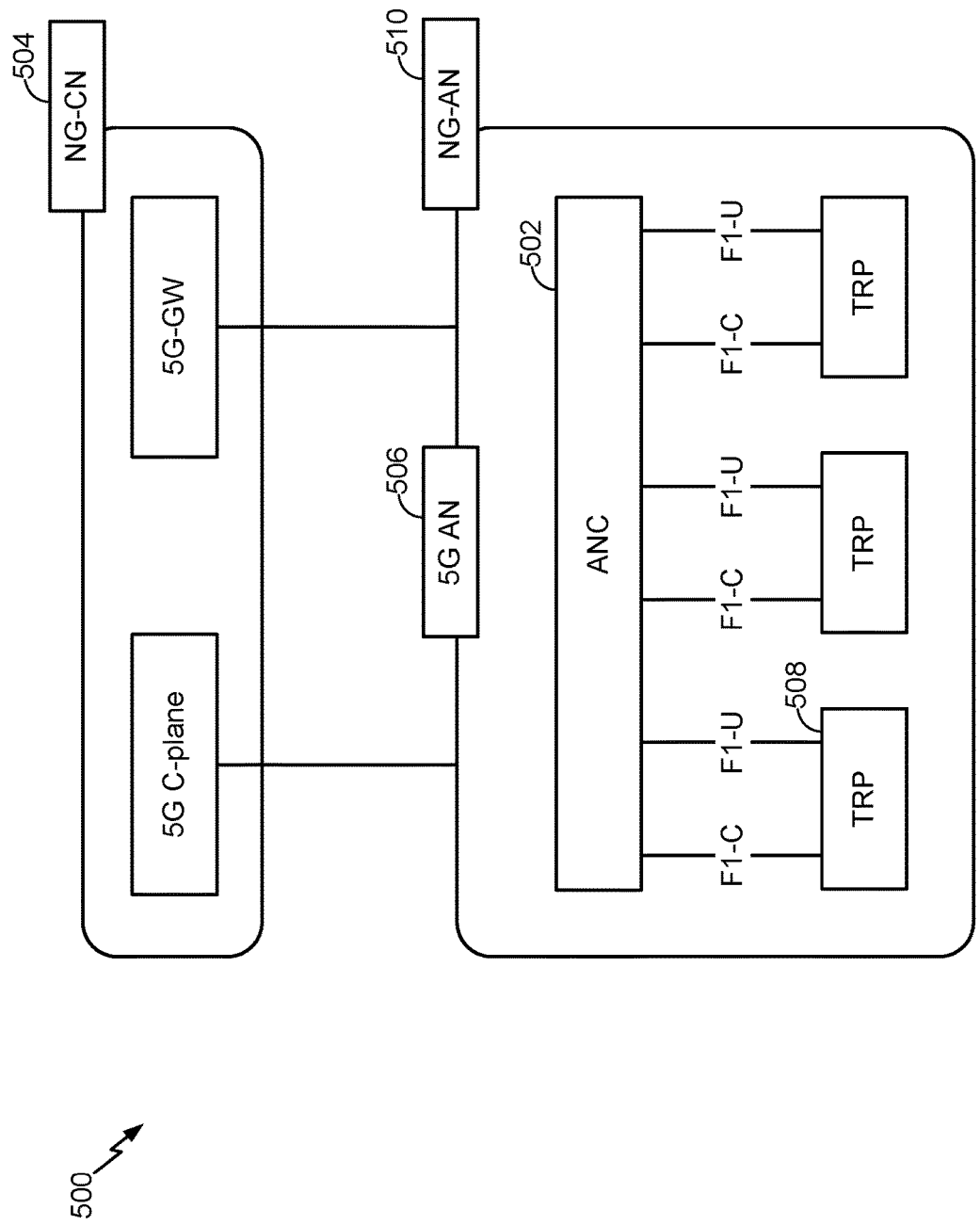
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual-connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
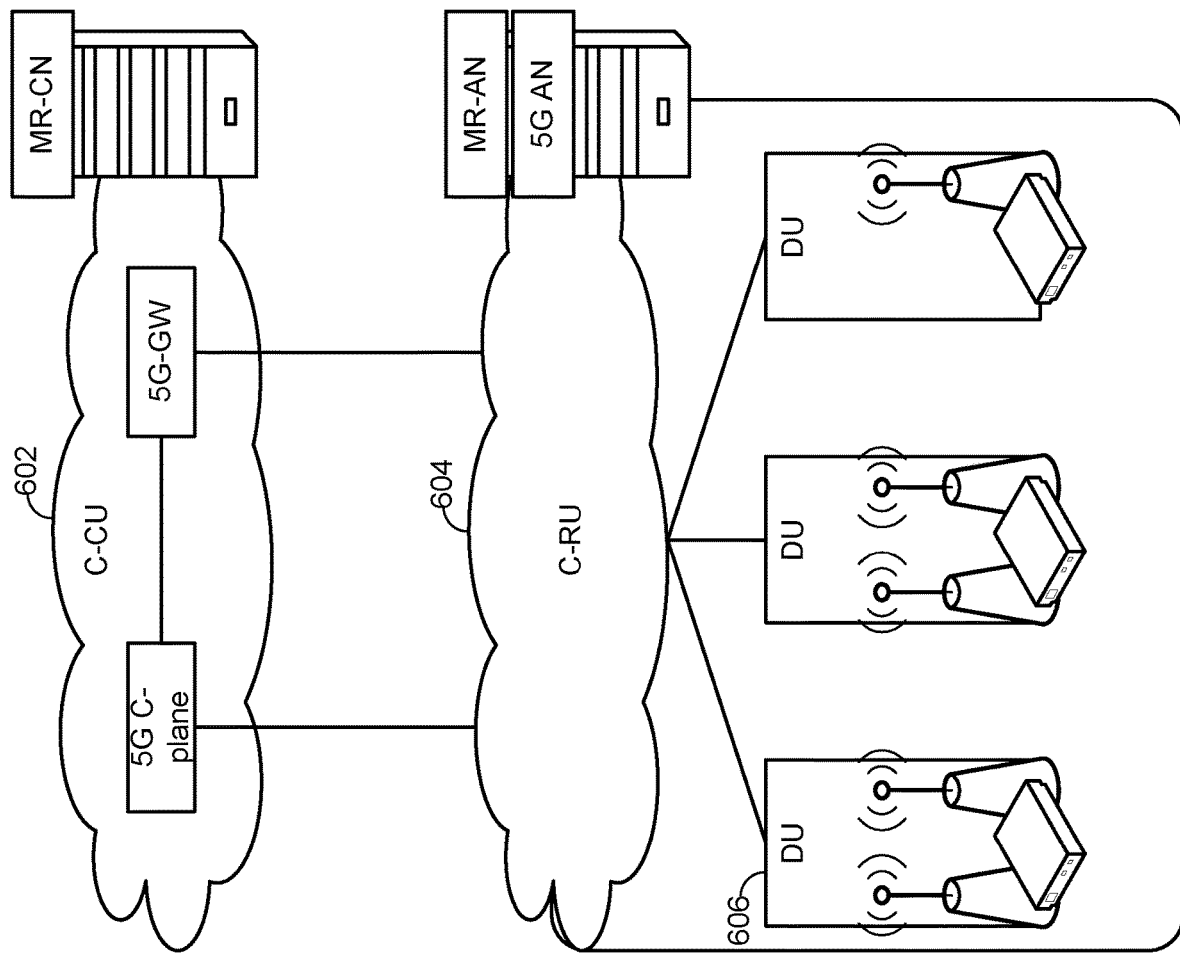
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

A UE may transition from a first radio resource control (RRC) connection state to a second RRC connection state. For example, the UE may transition from an RRC connected state to an RRC idle state to improve UE performance and/or network performance, relative to remaining in the RRC connected state when the UE is not to communicate data with the network for a period of time. However, in the RRC idle state, the UE and a node of a network (e.g., a base station) may release configuration information associated with one or more cells, such as a context associated with the UE and/or the node. In this case, resuming communication for a multi-connectivity mode, such as a dual-connectivity mode, with the network to receive data may result in excessive network traffic. Thus, the UE may transition from an RRC connected state to a particular type of RRC connection state, which may be termed an RRC inactive state or a light connection state, wherein the UE and/or the network maintains at least a portion of configuration information to enable a reduced amount of network traffic to resume an RRC connection after entering the particular RRC connection state. This portion of configuration information may be termed context information or a UE context.

Multi-connectivity, such as dual-connectivity, refers to a technique wherein a UE connects to at least one master cell that handles paging for the UE, as well as at least one secondary cell. Multi-connectivity can be used within the same radio access technology (e.g., LTE, NR, etc.), or across multiple, different radio access technologies. As one example, some NR deployments may use an LTE node as a master node, and may use an NR node as a secondary node.

A UE in RRC idle or RRC inactive mode may perform cell reselection to select an appropriate cell for an RRC connection when entering RRC active mode (e.g., when the UE has moved from coverage of one cell to coverage of another cell). However, cell reselection for UEs in RRC inactive mode may present certain difficulties, especially for dual-connectivity UEs. For example, for a dual-connectivity UE, a target master node and a target secondary node may access context information for the UE to facilitate switching to RRC active mode. However, the context information may not be stored by the target master node and/or the target secondary node when the target master node and/or the target secondary node are different than an original or camped master node and/or secondary node of the UE. Also, the UE may be associated with one or more existing connections or configurations with a secondary node, such as a secondary cell group (SCG) and/or the like. When the UE selects a new secondary carrier, it may be necessary to reconfigure the one or more existing connections or configurations.

Some techniques and apparatuses, described herein, provide distribution of context information to target nodes associated with cell reselection by a UE in an RRC inactive mode, as well as various other aspects relating to mobility by a UE in an RRC inactive mode. For example, some techniques and apparatuses described herein provide configuration or teardown of backhaul interfaces (e.g., an X2 interface, an Xn interface, and/or the like) between master nodes and secondary nodes associated with the UE. Additionally, or alternatively, some techniques and apparatuses described herein provide signaling between a master node and a secondary node to cause the UE to enter the RRC inactive mode. In this way, handling of mobility aspects of an RRC inactive UE associated with dual-connectivity is improved, thereby reducing delay associated with entering an RRC active mode, conserving network resources, and improving user experience.

Figure 7A:
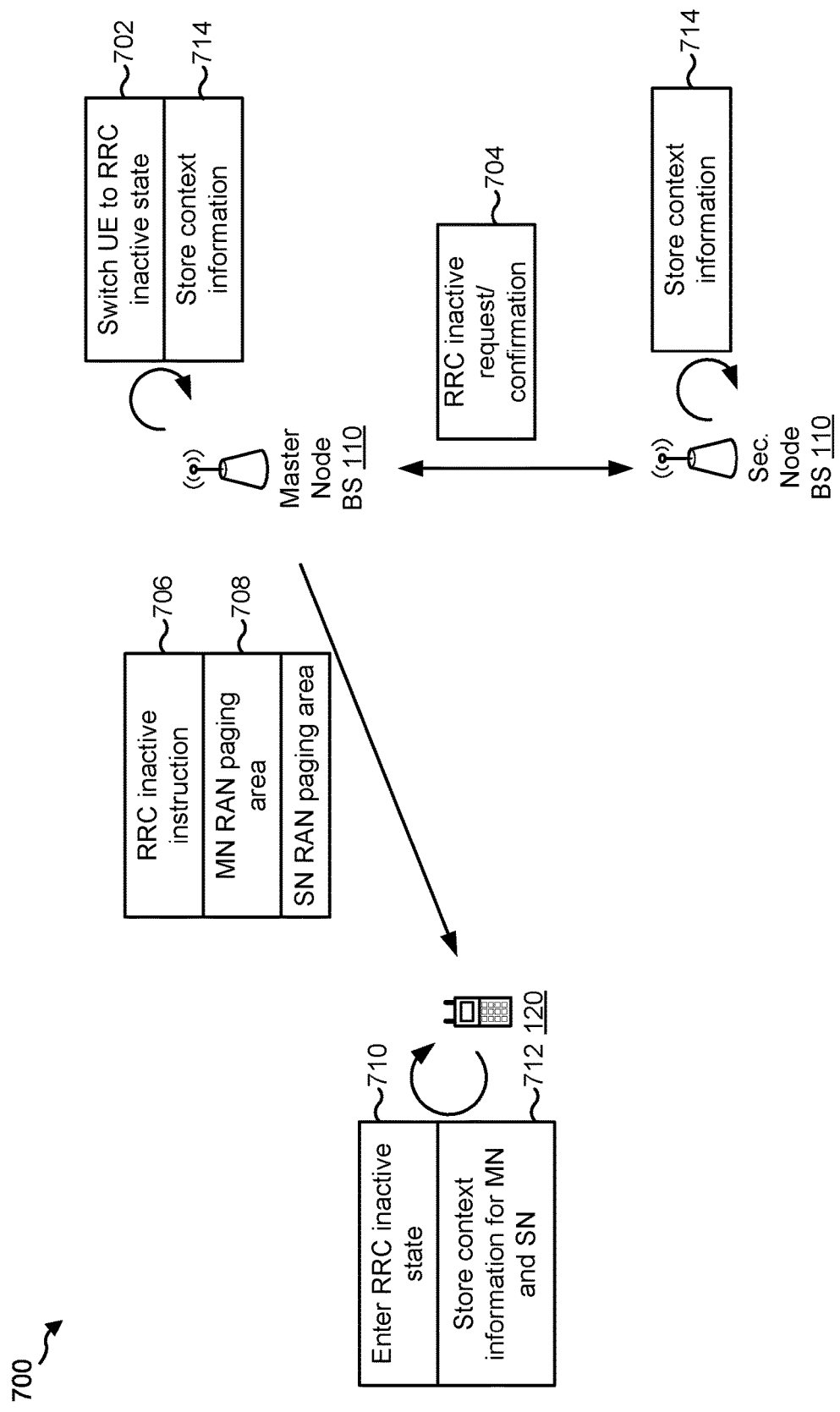
FIGS. 7A and 7B are diagrams illustrating examples of configuring and entering a radio resource control inactive communication state, in accordance with various aspects of the present disclosure.
Figure 7B:
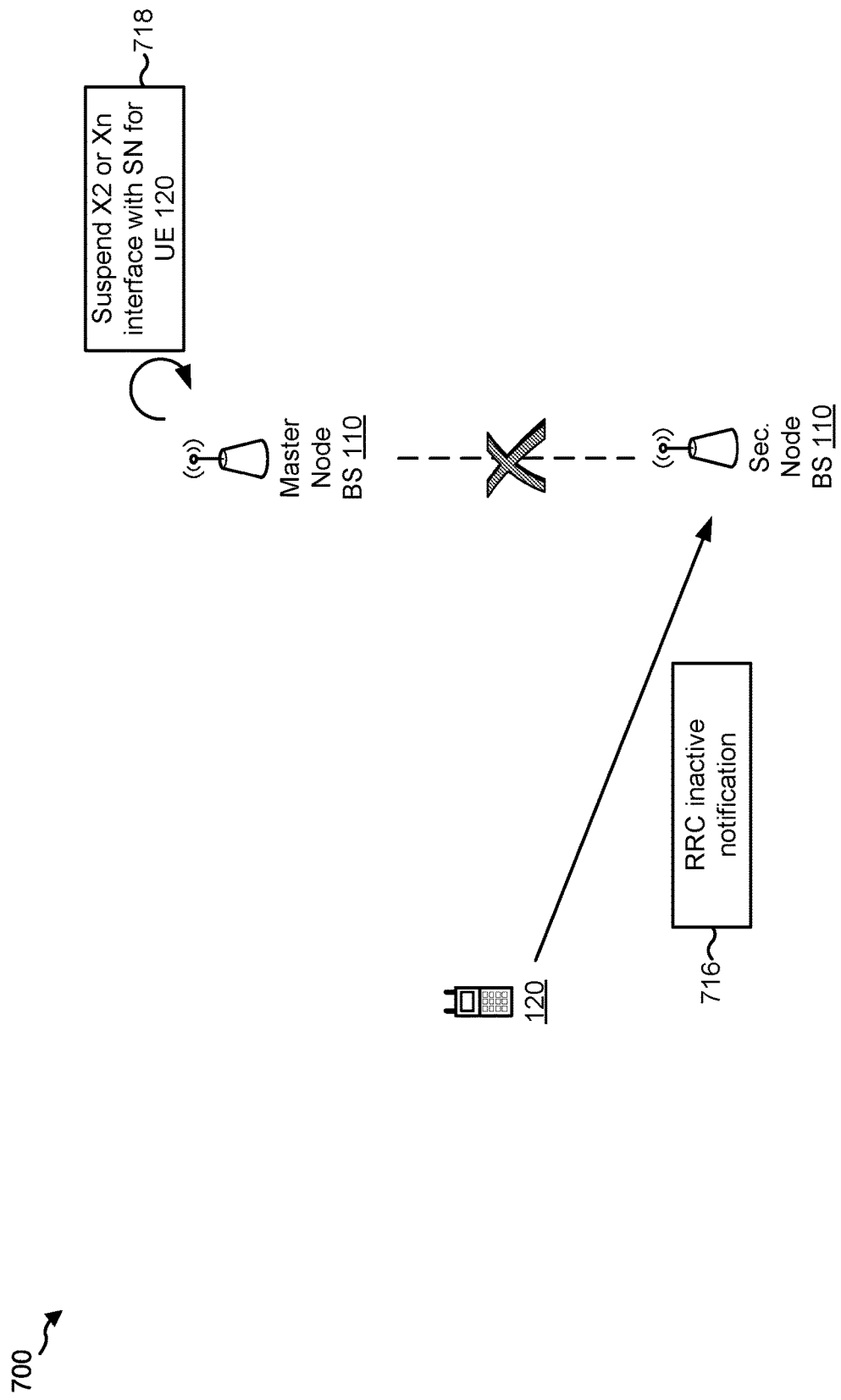

FIGS. 7A and 7B are diagrams illustrating examples 700 of configuring and entering a radio resource control inactive communication state, in accordance with various aspects of the present disclosure. FIGS. 7A and 7B show a master node BS 110 and a secondary node BS 110 (e.g., BS 110 of FIG. 1 and/or the like), which are referred to in the discussion of FIGS. 7A and 7B as a master node and a secondary node. For example, the UE 120 shown in FIGS. 7A and 7B may be associated with the master node and the secondary node based at least in part on a dual-connectivity configuration of the UE 120. In some aspects, the master node may handle paging, RRC state transitions, and/or context information transitions regarding the UE 120, and the secondary node may be used for data transfer and/or the like.

As shown in FIG. 7A, and by reference number 702, the master node may determine that the UE 120 is to switch to an RRC inactive state. For example, the master node may perform such a determination based at least in part on configuration information associated with the UE 120, scheduling information associated with the UE 120, and/or the like. In some aspects, the master node may determine that the UE 120 is to switch to the RRC inactive state from an RRC connected state or an RRC active state.

As shown by reference number 704, the master node and the secondary node may perform a request and confirmation associated with the RRC inactive state switch. For example, the master node may transmit a request to the secondary node to switch the UE 120 to an RRC inactive communication state, and the secondary node may accept or confirm the request. In some aspects, the secondary node may reject the request (e.g., when the secondary node has data to transmit to the UE 120). In some aspects, the secondary node may transmit the request to the master node (rather than the master node sending the request to the secondary node). In such a case, the master node may transmit a confirmation to the secondary node, may reject the request, or may determine that the request is confirmed and configure the UE 120 to enter the RRC inactive state accordingly.

As shown by reference number 706, the master node may transmit an RRC inactive instruction to the UE 120. For example, the master node may configure the UE 120 to enter the RRC inactive state. In some aspects, to configure the UE 120 to enter the RRC inactive state, the master node may terminate one or more interfaces with the core network or another BS 110, may configure a master carrier group (MCG) or secondary cell group (SCG) of the UE 120, or may perform a similar action.

As shown by reference number 708, in some aspects, the master node may provide information identifying at least one radio access network (RAN) paging area. A RAN paging area may identify a candidate node or cell for cell reselection by the UE 120. A node of a RAN paging area may be preconfigured to handle transfer of context information associated with the UE 120 without involving the master node, so, by selecting a node of a RAN paging area, the UE 120 may conserve resources of the master node. For example, when the UE 120 selects a cell of a RAN paging area as part of a cell reselection, the UE 120 may not need to notify the master node, which reduces messaging of the UE 120 and conserves network resources. As further shown, the master node provides a master node (shown as MN in FIG. 7A and thereafter) RAN paging area, and provides a secondary node (shown as SN in FIG. 7A and thereafter) paging area. In some aspects, the nodes identified by the RAN paging areas may be nodes associated with an interface (e.g., an X2 interface or Xn interface) with the master node.

As shown by reference number 710, the UE 120 may enter an RRC inactive state based at least in part on the RRC inactive instruction. For example, the UE 120 may cease paging (e.g., may intermittently cease paging), may power down a radio or one or more other components of the UE 120, and/or the like. As shown by reference number 712, the UE 120 may store context information for the master node and the secondary node based at least in part on entering the RRC inactive communication state. For example, the UE 120 may store information that expedites switching to an RRC connected communication state, such as UE/user identities, a UE mobility state, a security parameter, and/or the like. As shown by reference number 714, the master node and the secondary node may store context information for the UE 120. The context information stored by the master node and the secondary node may include information used to establish an RRC connected communication state with the UE 120, such as information identifying the UE 120, information identifying the master node and/or the secondary node, a security parameter, and/or the like. By storing the context information when the UE 120 is in the RRC inactive state, the UE 120, the master node, and the secondary node reduce delay associated with switching the UE 120 to the RRC connected communication state, thereby improving throughput, network performance, and user experience.

As shown in FIG. 7B, and by reference number 716, the UE 120 may provide an RRC inactive notification to the secondary node. For example, the RRC inactive notification may be provided via a signaling bearer between the UE 120 and the secondary node. In some aspects, the RRC inactive notification may indicate that the UE 120 is in an RRC inactive communication state. In some aspects, the master node may provide the RRC inactive notification to the secondary node (e.g., based at least in part on transmitting the RRC inactive instruction to the UE 120, based at least in part on receiving information from the UE 120 indicating that the UE 120 has entered the RRC inactive state, and/or the like).

As shown by reference number 718, the master node may suspend an interface with the secondary node with regard to the UE 120. For example, the UE 120 may be associated with an X2 or Xn interface between the master node and the secondary node. The master node may suspend the X2 or Xn interface to conserve resources of the master node. An X2 interface may be used when the master node is an eNB (e.g., associated with an LTE network) and an Xn interface may be used when the master node is a gNB (e.g., associated with a 5G or NR network). Techniques and apparatuses described herein are applicable in scenarios wherein both nodes are associated with an LTE network, wherein both nodes are associated with a 5G network, and wherein one node is associated with an LTE network and one node is associated with a 5G network.

As indicated above, FIGS. 7A and 7B are provided as examples. Other examples are possible and may differ from what was described with respect to FIGS. 7A and 7B.

Figure 8A:
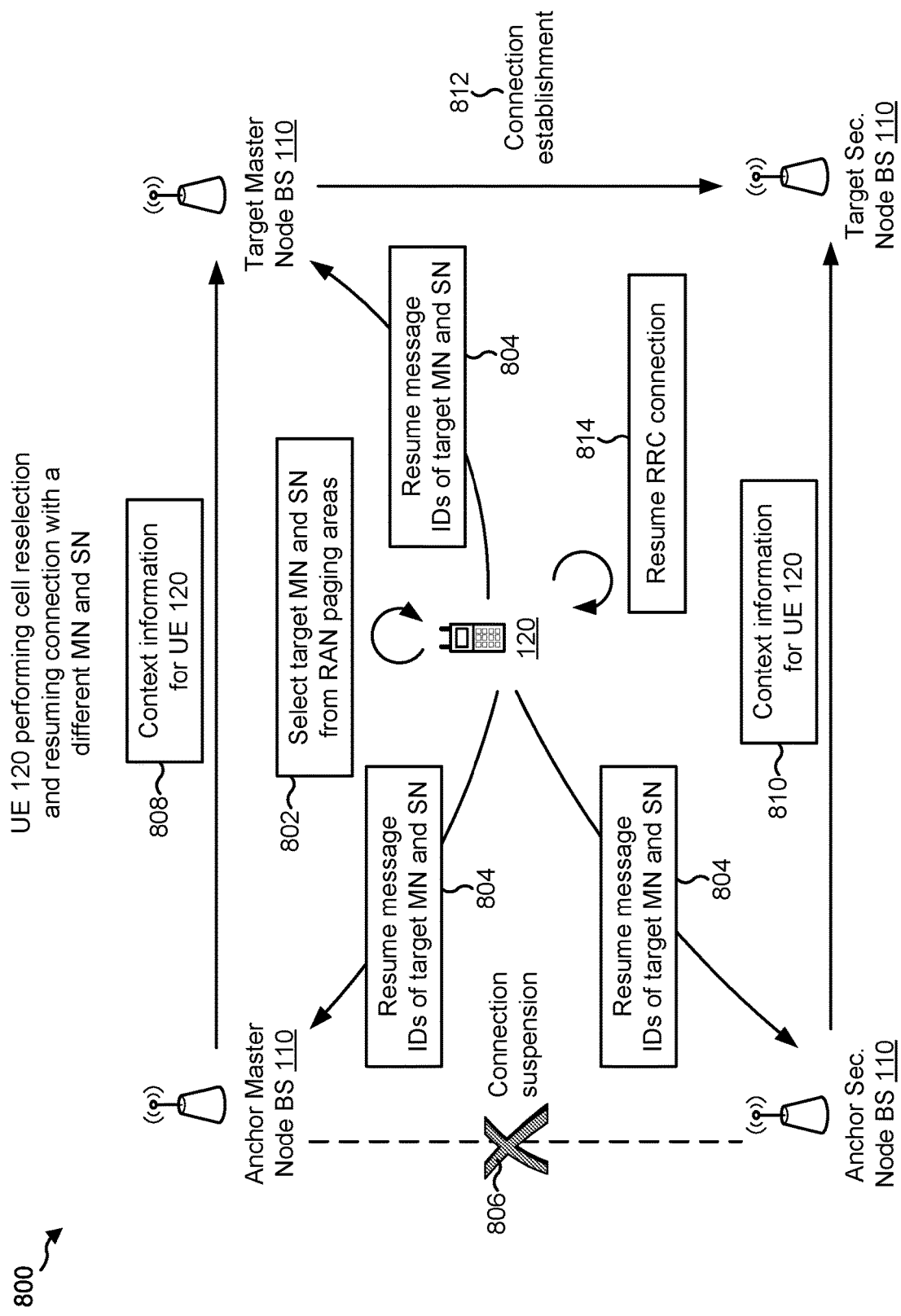
FIGS. 8A and 8B are diagrams illustrating examples of cell reselection and switching to a radio resource control active connection state, in accordance with various aspects of the present disclosure.
Figure 8B:
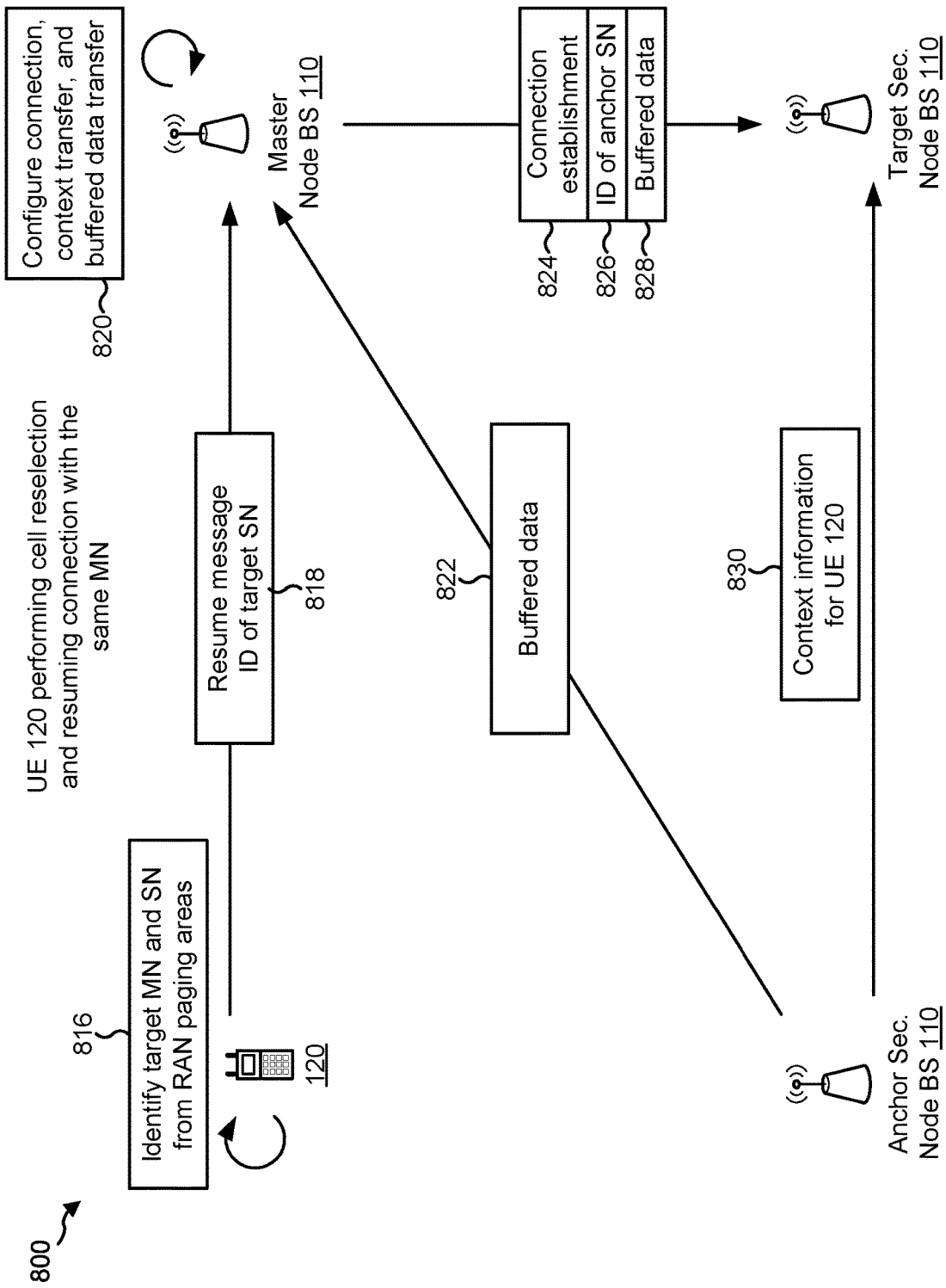

FIGS. 8A and 8B are diagrams illustrating examples of cell reselection and switching to a radio resource control active connection state, in accordance with various aspects of the present disclosure. FIG. 8A shows an anchor master node and a target master node (e.g., BSs 110), as well as an anchor secondary node and a target secondary node (e.g., BSs 110). The anchor master node and anchor secondary node may be nodes which store context information for a UE 120 shown in FIG. 8A. For example, the UE 120 may have previously connected to the anchor master node and the anchor secondary node, so the anchor master node and the anchor secondary node may have previously stored context information regarding the UE 120. For the purpose of FIGS. 8A and 8B, assume that the operations described in connection with FIGS. 7A and 7B have been performed.

As shown by reference number 802, the UE 120 may select the target master node and the target secondary node based at least in part on RAN paging areas associated with the UE 120. As used herein, selecting refers to the process of cell reselection performed by the UE 120. For example, when in RRC idle or RRC inactive mode, the UE 120 may select a target node based at least in part on one or more criteria. The target node may be the same as an anchor node of the UE 120, or may be different than an anchor node of the UE 120. If the UE 120 initiates an RRC connected mode or an RRC connection, the UE 120 may connect to a most recently selected target node. In FIG. 8A, the UE 120 initiates an RRC connection with a target master node that is different than an anchor master node of the UE 120, and with a target secondary node that is different than an anchor secondary node of the UE 120. In this case, context information and/or other information may need to be exchanged between the target nodes, the anchor nodes, and/or the UE 120.

In some aspects, the UE 120 may select the target node from a set of nodes of a RAN paging area of nodes. A node of a RAN paging area may be preconfigured to handle transfer of context information associated with the UE without involving the master node, so, by selecting a node of a RAN paging area, the UE 120 may conserve resources of the master node. Additionally, or alternatively, the UE 120 may select the target node from a subset of nodes of a RAN paging area (e.g., fewer than all nodes of the RAN paging area). Additionally, or alternatively, the UE 120 may select the target node from a set of nodes other than nodes of a RAN paging area of the UE 120. The target node referred to in this paragraph may be the target master node and/or the target secondary node. Additionally, or alternatively, the UE 120 may select the target master node from a first RAN paging area (e.g., a RAN paging area for master nodes) and may select the target secondary node from a second RAN paging area (e.g., a RAN paging area for secondary nodes).

As shown by reference number 804, the UE 120 may provide a resume message to at least one of the target master node, the anchor master node, and/or the anchor secondary node. In some aspects, the UE 120 may provide the resume message to the target secondary node. As further shown, the resume message may identify at least one of the target master node or the target secondary node. For example, the UE 120 may provide a resume message to the target master node identifying the target secondary node. Additionally, or alternatively, the UE 120 may provide a resume message to the target master node identifying the anchor master node (e.g., to facilitate acquisition of the context information). Additionally, or alternatively, the UE 120 may provide a resume message to the anchor master node identifying the target master node (e.g., to facilitate provision of the context information to the target master node). Additionally, or alternatively, the UE 120 may provide a resume message to the anchor secondary node (e.g., to facilitate provision of buffered data and/or context information to the target secondary node).

As shown by reference number 806, the anchor master node may suspend a connection with the anchor secondary node. For example, the anchor master node may suspend an X2 or Xn interface, a bearer, and/or the like with the anchor secondary node. As shown by reference number 808, the anchor master node may provide context information for the UE 120 to the target master node. For example, the anchor master node may identify the target master node based at least in part on the resume message, and may provide the context information accordingly. In some aspects, the anchor master node may provide the context information to the target master node based at least in part on a request from the target master node. In some aspects (e.g., when there is no X2 or Xn interface with the anchor master node), the target master node may obtain the context information from the core network.

As shown by reference number 810, the anchor secondary node may provide context information for the UE 120 to the target secondary node. For example, the anchor secondary node may identify the target secondary node based at least in part on the resume message, and may provide the context information accordingly. In some aspects, the anchor secondary node may provide the context information to the target secondary node based at least in part on a request from the target secondary node. Additionally, or alternatively, the anchor secondary node may provide the context information to the target master node or the anchor master node for provision to the target secondary node. In some aspects (e.g., when there is no X2 or Xn interface with the anchor secondary node), the target secondary node may obtain the context information from the core network.

As shown by reference number 812, the target master node may establish a connection with the target secondary node. For example, the target master node may identify the target secondary node based at least in part on the resume message, and may establish an X2 or Xn interface with the target secondary node. As shown by reference number 814, the UE 120 may resume an RRC connection with the target master node and the target secondary node. For example, the UE 120, the target master node, and the target secondary node may establish an RRC connection using the context information, which may be quicker than establishing an RRC connection without the context information. In this way, the anchor master node and the target master node facilitate provision of context information for UE 120 when the UE 120 is resuming an RRC connection with the target master node and the target secondary node.

FIG. 8B is an example wherein a UE 120 has selected a target master node and a target secondary node, wherein the target master node is a same node as the anchor master node and the target secondary node is a different node than the anchor secondary node. Since the target master node is the anchor master node in FIG. 8B, the target master node is simply referred to as the master node.

As shown by reference number 816, the UE 120 may identify the master node and the target secondary node using at least one RAN paging area, as described in more detail in connection with FIG. 8A, above.

As shown by reference number 818, the UE 120 may transmit, to the master node, a resume message identifying the target secondary node. Here, the resume message need not identify the anchor secondary node, since the master node is associated with a connection to the anchor secondary node based at least in part on having established a connection with the UE 120 and the anchor secondary node in accordance with a dual-connectivity configuration of the UE 120.

As shown by reference number 820, the master node may configure at least one of a connection, a context transfer, and/or a buffered data transfer. The master node may configure the connection, the context transfer, and/or the buffered data transfer with the anchor secondary node and/or the target secondary node, as described below.

As shown by reference number 822, the anchor secondary node may provide buffered data to the master node (e.g., based at least in part on a request for the buffered data from the master node). For example, the buffered data may be downlink data for the UE 120. The anchor secondary node may provide the buffered data to be forwarded to the UE 120 via the master node. In some aspects, the anchor secondary node may provide the buffered data to the target secondary node (rather than to the master node). For example, in a case wherein the anchor secondary node knows an identity of the target secondary node (e.g., based at least in part on a resume message and/or the like), the anchor secondary node may provide the buffered data to the target secondary node.

As shown by reference number 824, the master node may establish a connection with the target secondary node. For example, when the master node is not associated with an X2 or Xn interface with the target secondary node, the master node may establish such an interface with the target secondary node. In some aspects, the master node may configure a carrier group with regard to the target secondary node. For example, the master node may change an SCG split bearer to an SCG bearer or an MCG bearer if the target secondary node does not support SCG split bearers. In some aspects, the UE 120 may drop or flush an SCG based at least in part on moving from the anchor secondary node to the target secondary node. In some aspects, the master node may release or suspend a connection or interface with the anchor secondary node for the UE 120 (e.g., based at least in part on establishing a connection with the target secondary node for the UE 120).

As shown by reference number 826, the master node may provide an identifier of the anchor secondary node to the target secondary node. For example, the target secondary node may use the identifier to obtain context information from the anchor secondary node. As shown by reference number 828, the master node may provide the buffered data of the anchor secondary node to the target secondary node. For example, the master node may provide the buffered data in a case where the anchor secondary node does not provide the buffered data to the target secondary node (e.g., in a case where the anchor secondary node does not know the identity of the target secondary node). As shown by reference number 830, the anchor secondary node may provide the context information to the target secondary node.

As indicated above, FIGS. 8A and 8B are provided as examples. Other examples are possible and may differ from what was described with respect to FIGS. 8A and 8B.

FIG. 9 is a diagram illustrating an example process 900 performed, for example, by a UE, in accordance with various aspects of the present disclosure. Example process 900 is an example where a UE (e.g., UE 120) performs mobility operations for a dual-connectivity UE.

As shown in FIG. 9, in some aspects, process 900 may include selecting at least one target node for a radio resource control connection (block 910). For example, the UE (e.g., using controller/processor 280 and/or the like) may select at least one target node for an RRC connection, as described above. In some aspects, the UE may be in a particular RRC communication state when the at least one target node is selected (e.g., an RRC inactive state). In some aspects, the UE may be configured to communicate using dual-connectivity with a master node and a secondary node, wherein context information associated with the UE is stored by the UE, the master node associated with the UE, and the secondary node associated with the UE based at least in part on the UE being in the particular radio resource control communication state.

As shown in FIG. 9, in some aspects, process 900 may include transmitting information to the at least one target node or a master node to cause context information to be provided to the at least one target node (block 920). For example, the UE (e.g., using controller/processor 280, transmit processor 264, TX MIMO processor 266, MOD 254, antenna 252, and/or the like) may transmit information to the at least one target node or a master node (e.g., an anchor master node or target master node) to cause context information (e.g., context information associated with the UE) to be provided to the at least one target node.

In some aspects, the at least one target node is a new secondary node with regard to the dual connectivity configuration of the user equipment, and the UE may send an identifier of the new secondary node to the master node to cause the context information to be provided to the at least one target node. In some aspects, the at least one target node is a new secondary node with regard to the dual connectivity configuration of the user equipment, and is selected from a set of nodes associated with a radio access network (RAN) paging area of the user equipment, and the transmitting of the information to the at least one target node causes a context fetch of the context information by the new secondary node from the secondary node.

In some aspects, the at least one target node is selected from a subset of nodes associated with a radio access network (RAN) paging area of the user equipment. In some aspects, the at least one target node is not included in a set of nodes associated with a radio access network (RAN) paging area of the user equipment. In some aspects, the at least one target node is a new master node with regard to the dual connectivity configuration of the user equipment. In some aspects, the at least one target node includes a new master node or a new secondary node with regard to the dual connectivity configuration of the user equipment. In some aspects, the user equipment is configured to reselect to the new master node and to reselect to the new secondary node from the master node and the secondary node, respectively.

In some aspects, prior to the selection of the at least one target node, the user equipment enters the particular radio resource control communication state based at least in part on a command from the master node. In some aspects, the UE may transmit a notification to the secondary node after the user equipment enters the particular radio resource control communication state.

In some aspects, the user equipment is configured to release a secondary cell group (SCG) associated with the secondary node based at least in part on establishing the radio resource control connection with the at least one target node which is different than the master node. In some aspects, the user equipment is configured to release a secondary cell group (SCG) associated with the secondary node based at least in part on a channel quality associated with the secondary node. In some aspects, the user equipment is configured to release the SCG based at least in part on a threshold specified by the master node. In some aspects, the particular radio resource control communication state includes at least one of an inactive state or a light communication state. In some aspects, the user equipment is configured to send information identifying the at least one target node to the master node.

In some aspects, the at least one target node is a new secondary node, and wherein the information identifying the at least one target node is sent upon connection reestablishment. In some aspects, the information identifying the at least one target node further includes a channel quality measurement for the at least one target node. In some aspects, the at least one target node is a same node as the secondary node based at least in part on a channel quality measurement associated with the secondary node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
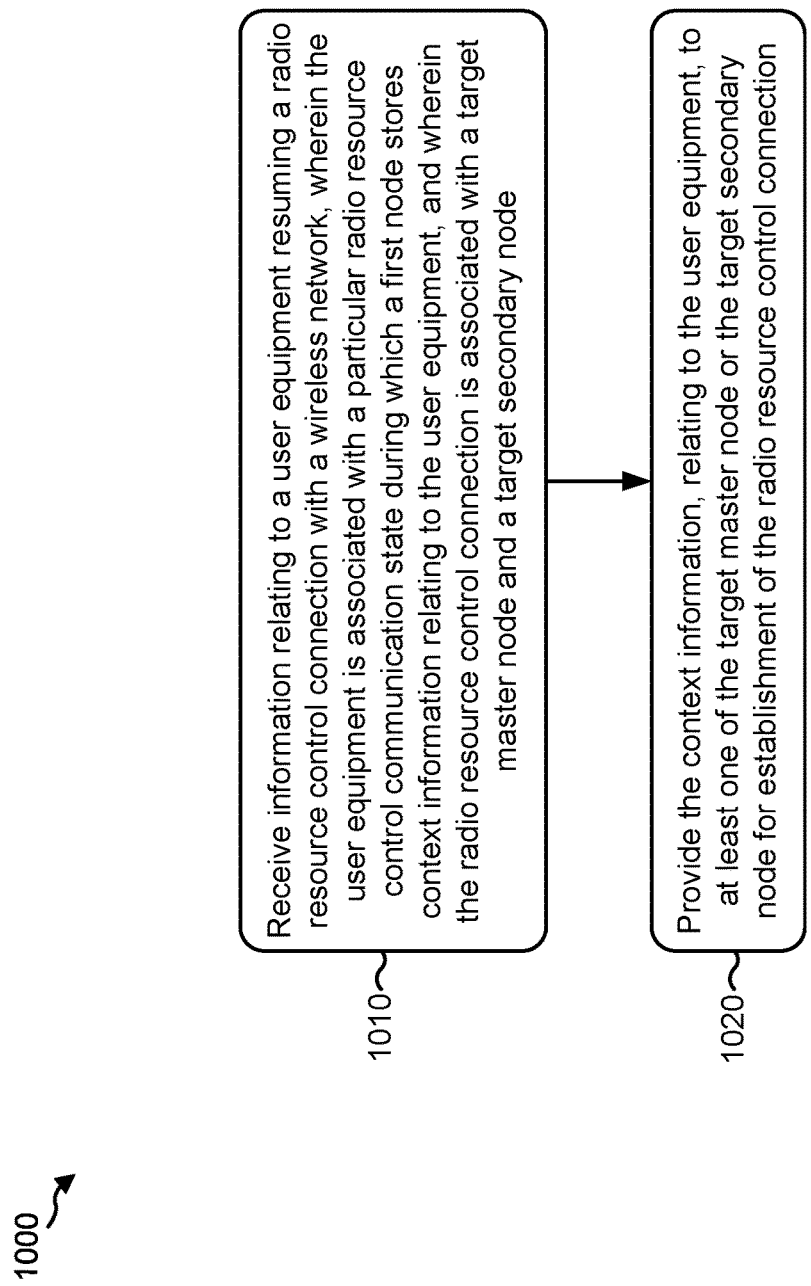
FIG. 10 is a diagram illustrating an example process performed, for example, by a node, in accordance with various aspects of the present disclosure.

FIG. 10 is a diagram illustrating an example process 900 performed, for example, by a first node, in accordance with various aspects of the present disclosure. Example process 900 is an example where a first node (e.g., BS 110) performs mobility operations for a dual-connectivity UE. In some aspects, the first node may be a master node BS 110. For example, the first node may be an anchor master node BS 110 or a target master node BS 110.

As shown in FIG. 10, in some aspects, process 1000 may include receiving information relating to a user equipment resuming a radio resource control connection with a wireless network, wherein the user equipment is associated with a particular radio resource control communication state during which the first node stores context information relating to the user equipment, and wherein the radio resource control connection is associated with a target master node and a target secondary node (block 1010). For example, the first node (e.g., using antenna 234, DEMOD 232, MIMO detector 236, receive processor 238, controller/processor 240, and/or the like) may receive information relating to a UE resuming an RRC connection with a wireless connection. The UE may be in a particular RRC communication state, such as an RRC inactive state. During the RRC inactive state, the first node may store context information relating to the UE. The RRC connection may be associated with a target master node and a target secondary node, at least one of which may be the same as the first node, or all of which may be different than the first node.

As shown in FIG. 10, in some aspects, process 1000 may include providing the context information, relating to the user equipment, to at least one of the target master node or the target secondary node for establishment of the radio resource control connection (block 1020). For example, the first node (e.g., using controller/processor 240, transmit processor 220, TX MIMO processor 230, MOD 232, antenna 234, and/or the like) may provide the context information to at least one of the target master node or the target secondary node for establishment of the RRC connection. Thus, the first node facilitates more expedient and simpler RRC connection setup for a UE that is in an RRC inactive state and associated with context information.

In some aspects, the first node may configure a radio bearer associated with the user equipment based at least in part on a configuration of the target master node or the target secondary node. In some aspects, the first node is a master node of the user equipment to which the user equipment connected prior to the user equipment connecting to the target master node. In some aspects, the first node may receive information indicating a backhaul connection has been configured between the target master node and the target secondary node. In some aspects, the first node is configured to release a backhaul connection with a particular secondary node of the user equipment to which the user equipment is connected when the information identifying the target secondary node is received. In some aspects, the first node may provide information identifying the target secondary node to a particular secondary node to which the user equipment is connected or has previously been connected, to cause the particular secondary node to provide the context information or buffered data stored by the particular secondary node. In some aspects, the first node is the target master node. In some aspects, the first node is configured to provide an instruction to cause the user equipment to enter the particular radio resource control communication state.

In some aspects, the first node is configured to suspend an interface between the first node and a secondary node of the user equipment while the user equipment is in the particular radio resource control communication state. In some aspects, the first node is configured to provide the instruction based at least in part on a confirmation from a secondary node of the user equipment that the instruction is to be provided. In some aspects, the first node is configured to provide information to a secondary node that the user equipment has entered the particular radio resource control communication state.

In some aspects, the first node is configured to identify a set of nodes of a radio access network (RAN) paging area associated with the user equipment, the set of nodes including at least one of the target master node or the target secondary node. In some aspects, the first node is configured to provide information identifying the set of nodes to the user equipment. In some aspects, the target master node is selected from a first set of nodes of a first radio access network (RAN) paging area and the target secondary node is selected from a second set of nodes of a second RAN paging area. In some aspects, the particular radio resource control communication state includes at least one of an inactive state or a light communication state. In some aspects, the first node may receive information identifying the target secondary node, wherein the first node is configured to provide the context information to the target secondary node based at least in part on receiving the information identifying the target secondary node. In some aspects, the first node may receive information identifying the target secondary node, wherein the first node is configured to provide the information identifying the target secondary node to a secondary node with which the user equipment was previously connected.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

A UE may transition from a first radio resource control (RRC) connection state to a second RRC connection state. For example, the UE may transition from an RRC connected state to an RRC idle state to improve UE performance and/or network performance, relative to remaining in the RRC connected state when the UE is not to communicate data with the network for a period of time. However, in the RRC idle state, the UE and a node of a network (e.g., a base station) may release configuration information associated with one or more cells. In this case, resuming communication for a multi-connectivity mode (e.g., a dual-connectivity mode) with the network to receive data may result in excessive network traffic. Thus, the UE may transition from an RRC connected state to a particular type of RRC connection state, which may be termed an RRC inactive state, wherein the UE and/or the network maintains at least a portion of configuration information to enable a reduced amount of network traffic to resume an RRC connection after entering the particular RRC connection state.

In the dual-connectivity mode, the UE may connect to multiple nodes of a network, such as a master node, a secondary node, and/or the like. The master node may control paging for the UE. In the dual-connectivity mode, a set of bearers may be established for the UE and the nodes. For example, a master cell group bearer may be established for a first node and a secondary cell group (SCG) bearer may be established for a second node. When the UE enters the particular type of RRC connection state (e.g., RRC inactive) and data is received at the first node, the first node may perform a paging procedure, the UE may resume a connection, and the UE may receive the data. However, when data is received at the second node for the UE, the first node may not be triggered to perform the paging procedure for the UE.

Some aspects, described herein, may perform dual-connectivity mode secondary cell group configuration to enable paging when downlink data is to be provided to a UE. In this way, a UE may be enabled to utilize an RRC inactive state for a dual-connectivity mode to reduce a utilization of network resources, such as signaling resources, and to reduce a network latency relative to utilizing an RRC idle state.

Figure 11A:
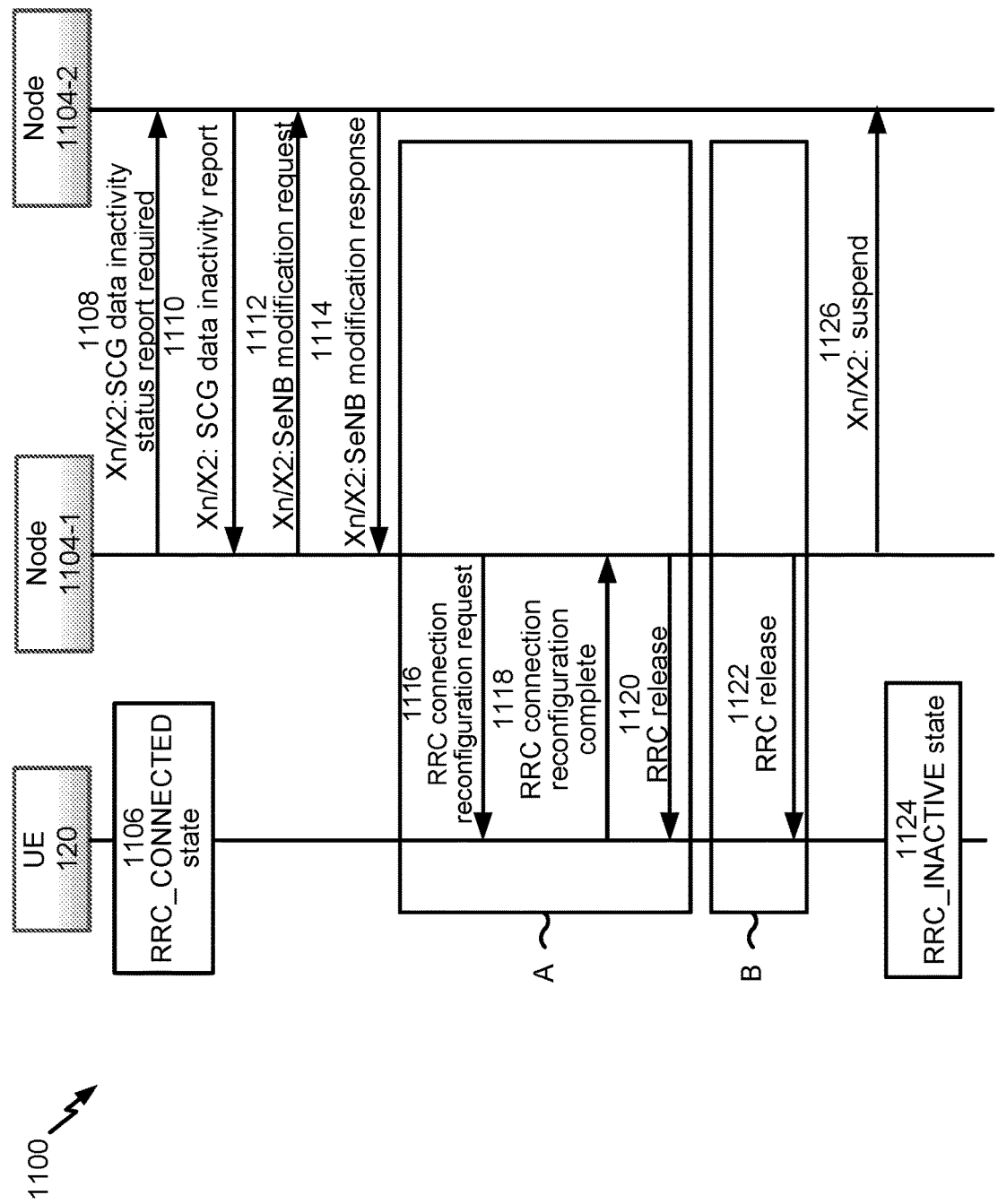
FIGS. 11A-11C are diagrams illustrating an example of dual-connectivity mode secondary cell group configuration, in accordance with various aspects of the present disclosure.
Figure 11B:
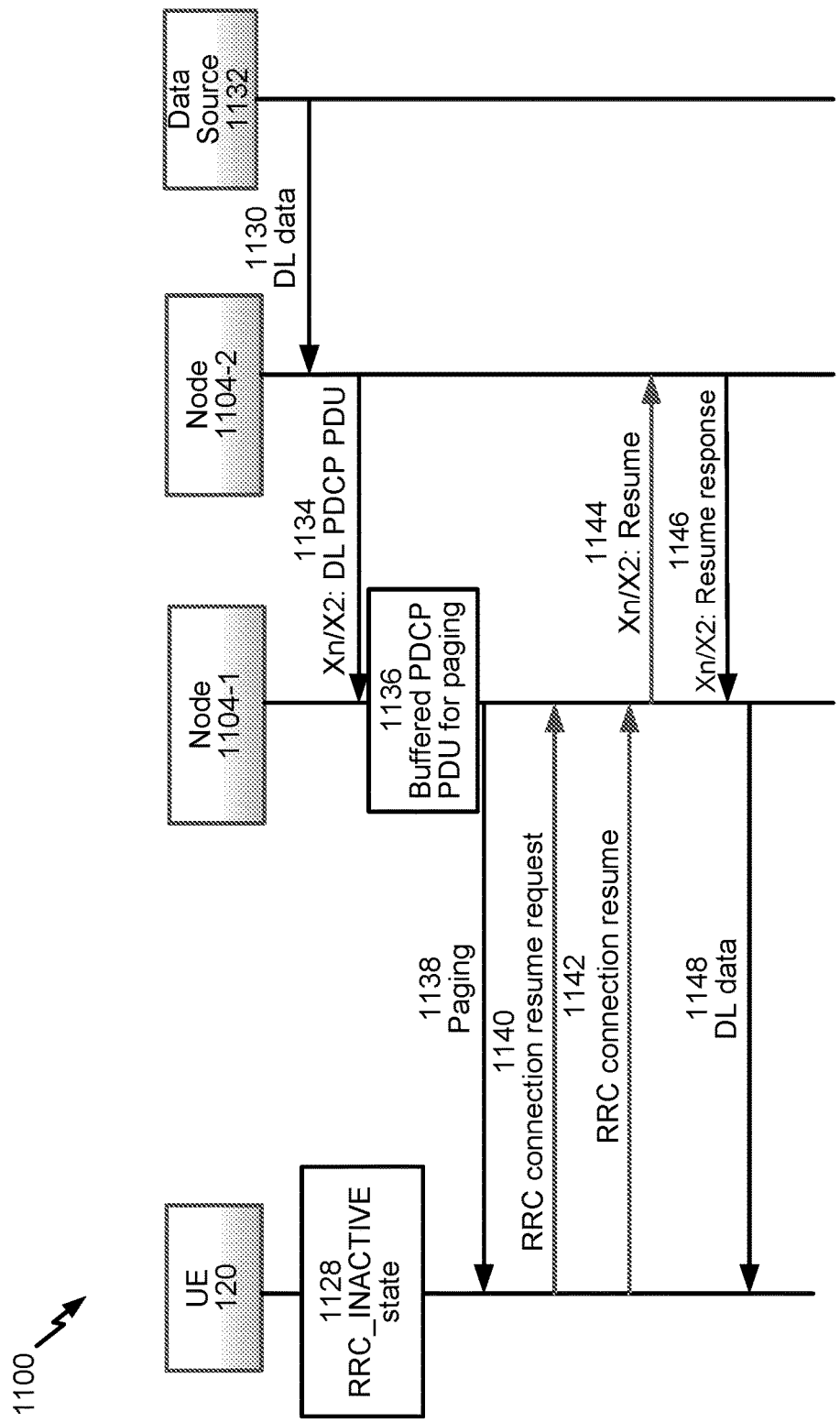
Figure 11C:
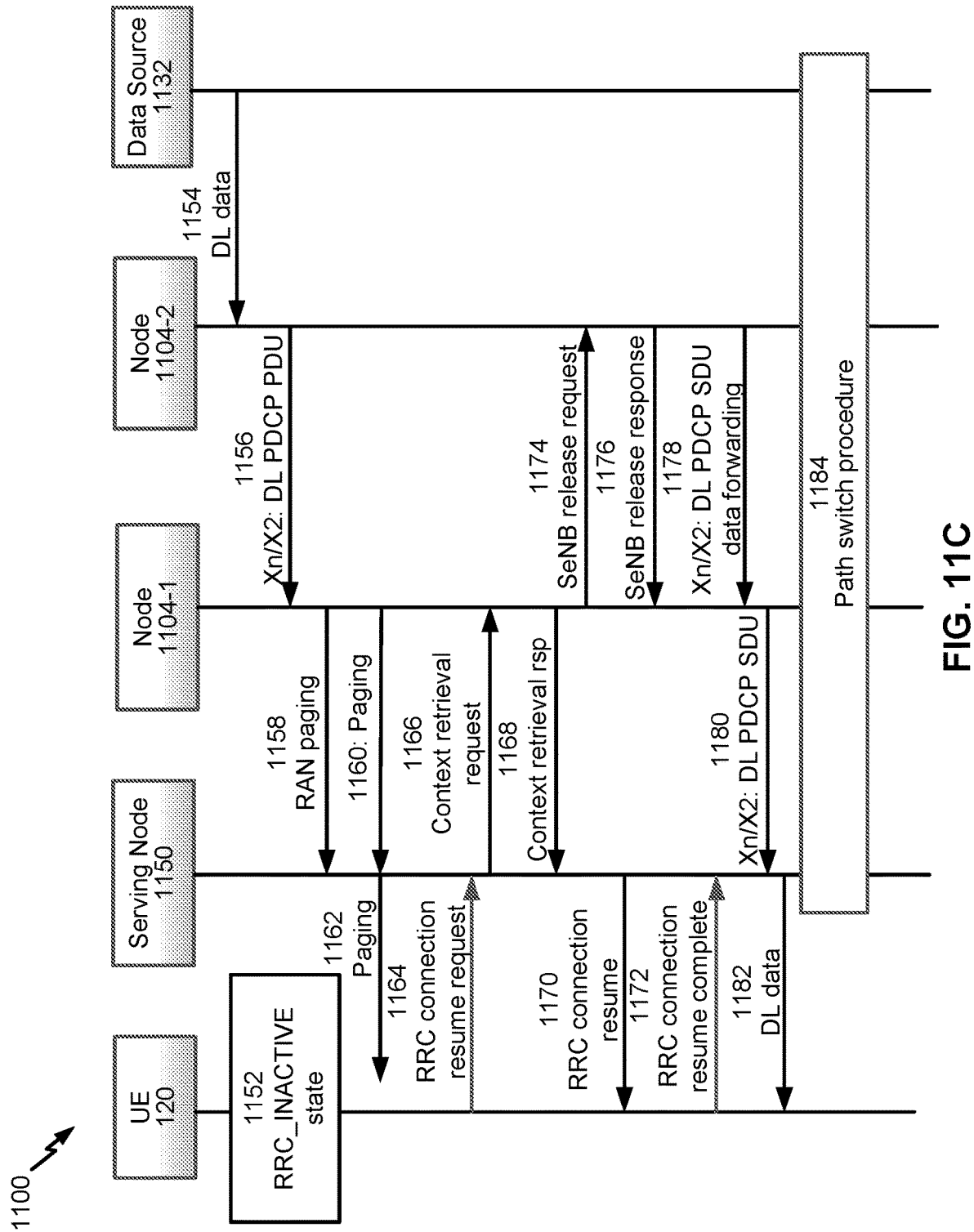

FIGS. 11A-11C are diagrams illustrating an example 1100 of dual-connectivity mode secondary cell configuration, in accordance with various aspects of the present disclosure. As shown in FIG. 11A, example 1100 includes a UE 120, which is operating in a dual-connectivity mode; a node 1104-1 (e.g., which may correspond to BS 110), which may be a master node; and a node 1104-2 (e.g., which may correspond to BS 110), which may be a secondary node. In some aspects, secondary node 1104-2 may support a different radio access technology (RAT) than master node 1104-1. This type of dual-connectivity may be referred to as "multi-RAT dual-connectivity," "dual-connectivity," and/or the like.

As further shown in FIG. 11A, and by reference number 1106, UE 120 may operate in an RRC connected state. As shown by reference number 1108, node 1104-1 may transmit an Xn/X2 (interface) message to node 1104-2 to request an SCG data inactivity status report for an SCG bearer associated with node 1104-2 and UE 120. As shown by reference number 1110, node 1104-1 may receive an Xn/X2 message including an SCG data inactivity report, and node 1104-1 may determine that UE 120 is to transition from the RRC connected state to an RRC inactive state, such as based at least in part on the inactivity report identifying that UE 120 is not receiving data from or transmitting data to a network. In some aspects, UE 120 may be configured to transition to another type of RRC state where node 1104-1 maintains a UE context, such as an RRC light connection state, an RRC semi-connected state, and/or the like.

As further shown in FIG. 11A, in connection with UE 120 transitioning from the RRC connected state to the RRC inactive state, node 1104-1 may reconfigure an SCG bearer associated with UE 120 and node 1104-2. For example, as shown by reference numbers 1112 and 1114, node 1104-1 and node 1104-2 may exchange Xn/X2 modification request/response messages to reconfigure the SCG bearer associated with node 1104-2 and UE 120 to an SCG split bearer associated with node 1104-1, node 1104-2, and UE 120. In some aspects, the SCG split bearer may be anchored by node 1104-2 and may be configured to cause downlink data from node 1104-2 to be provided to node 1104-1 to trigger node 1104-1 to perform network paging for UE 120.

As further shown in FIG. 11A, in a case A (e.g., a two-step RRC message exchange), node 1104-1 and UE 120 may exchange RRC messages 1116, 1118, and 1120 to transition UE 120 from the RRC connected state to the RRC inactive state. For example, node 1104-1 may perform a first step of requesting whether UE 120 can transition to the RRC inactive state and a second step of instructing UE 120 to transition to the RRC inactive state. As shown in case B (e.g., a one-step RRC message transmission), node 1104-1 may transmit a single RRC message 1122 to transition UE 120 from the RRC connected state to the RRC inactive state. For example, node 1104-1 may cause UE 120 to release to an RRC inactive state without node 1104-1 requesting permission to cause UE 120 to transition to the RRC inactive state.

In some aspects, UE 120 and/or node 1104-1 may maintain at least a portion of RRC configuration information in the RRC inactive state. For example, node 1104-1 may store a UE context associated with UE 120 to enable UE 120 to resume an RRC connection at a subsequent time with a reduced signaling overhead relative to resuming an RRC connection from an RRC idle mode. As shown by reference number 1124, based at least in part on the two-step RRC message exchange in case A or the one-step RRC message transmission in case B, UE 120 may be operating in the RRC inactive state. As shown by reference number 1126, node 1104-1 may transmit an Xn/X2 suspend message to suspend the SCG split bearer to cause downlink data directed to node 1104-2 to be provided to node 1104-1 to trigger radio access network paging. In this way, node 1104-1 may transmit a set of messages to reconfigure the SCG bearer to node 1104-1 to receive an indication of downlink data received at node 1104-2 and intended for UE 120.

As shown in FIG. 11B, and by reference number 1128, UE 120 may operate in the RRC inactive state (e.g., based at least in part on node 1104-1 causing UE 120 to transition to the RRC inactive state). As shown by reference number 1130, node 1104-2 may receive downlink data for UE 120 from a data source 1132 associated with the network. In this case, based at least in part on the SCG split bearer being configured for node 1104-1, node 1104-2, and UE 120, node 1104-2 may provide an indication of the downlink data to node 1104-1 to trigger radio access network paging by node 1104-1. As shown by reference number 1134, node 1104-1 may receive an indication of the downlink data. For example, node 1104-1 may receive a portion of the downlink data (e.g., an Xn/X2 downlink packet data convergence protocol (PDCP) protocol data unit (PDU) message), and may initiate paging for UE 120. As shown by reference numbers 1136 and 1138, node 1104-1 may buffer the PDCP PDU for paging, and may page UE 120 based at least in part on buffering the PDCP PDU.

As further shown in FIG. 11B, and by reference numbers 1140 and 1142, node 1104-1 may cause a connection to be resumed for UE 120 based at least in part on paging UE 120. As shown by reference numbers 1144 and 1146, node 1104-1 may exchange Xn/X2 messages with node 1104-2 to resume the connection for UE 120. In some aspects, a portion of configuration information stored by node 1104-1 and/or node 1104-2 may be used to resume the connection for UE 120. For example, node 1104-1 may use a UE context stored based at least in part on UE 120 being transitioned from the RRC connected state to cause UE 120 to resume a connection with node 1104-1 to receive data from node 1104-1. As shown by reference number 1148, node 1104-1 may provide the downlink data to UE 120. In some aspects, node 1104-1 may provide a portion of the downlink data to UE 120, and node 1104-2 may provide a portion of the downlink data to UE 120 (e.g., directly via an air interface) after node 1104-1 performs paging.

As shown in FIG. 11C, in another example wherein another node (e.g., serving node 1150, which may be another node that is to become secondary node for master node 1104-1) is to provide downlink data to UE 120, and as shown by reference number 1152, UE 120 may operate in the RRC inactive state. In this case, as shown by reference numbers 1154 and 1156, node 1104-2 may receive downlink data and may transmit a PDCP PDU message to node 1104-1 to cause node 1104-1 to trigger paging for UE 120. As shown by reference numbers 1158-1162, node 1104-1 may trigger RAN paging at serving node 1150, and based at least in part on the RAN paging may transmit another paging message for UE 120. In another example, node 1104-2 may directly trigger RAN paging at serving node 1150. In this case, node 1104-1 and serving node 1150 may transmit paging to UE 120. As shown by reference numbers 1164-1172, node 1104-1 may provide a UE context to enable UE 120 to resume an RRC connection with serving node 1150. As shown by reference numbers 1174-1180, node 1104-1 may trigger node 1104-2 to release as secondary node in the dual connectivity configuration, and to forward downlink PDCP service data units (SDUs) to serving node 1150 via node 1104-1 to enable serving node 1150 to provide downlink data to UE 120, as shown by reference number 1182. Finally, as shown by reference number 1184, serving node 1150, node 1104-1, node 1104-2, and data source 1132 may perform a path switch procedure to enable serving node 1150 to continue providing downlink data to UE 120.

As indicated above, FIGS. 11A-11C are provided as examples. Other examples are possible and may differ from what was described with respect to FIGS. 11A-11C.

Figure 12A:
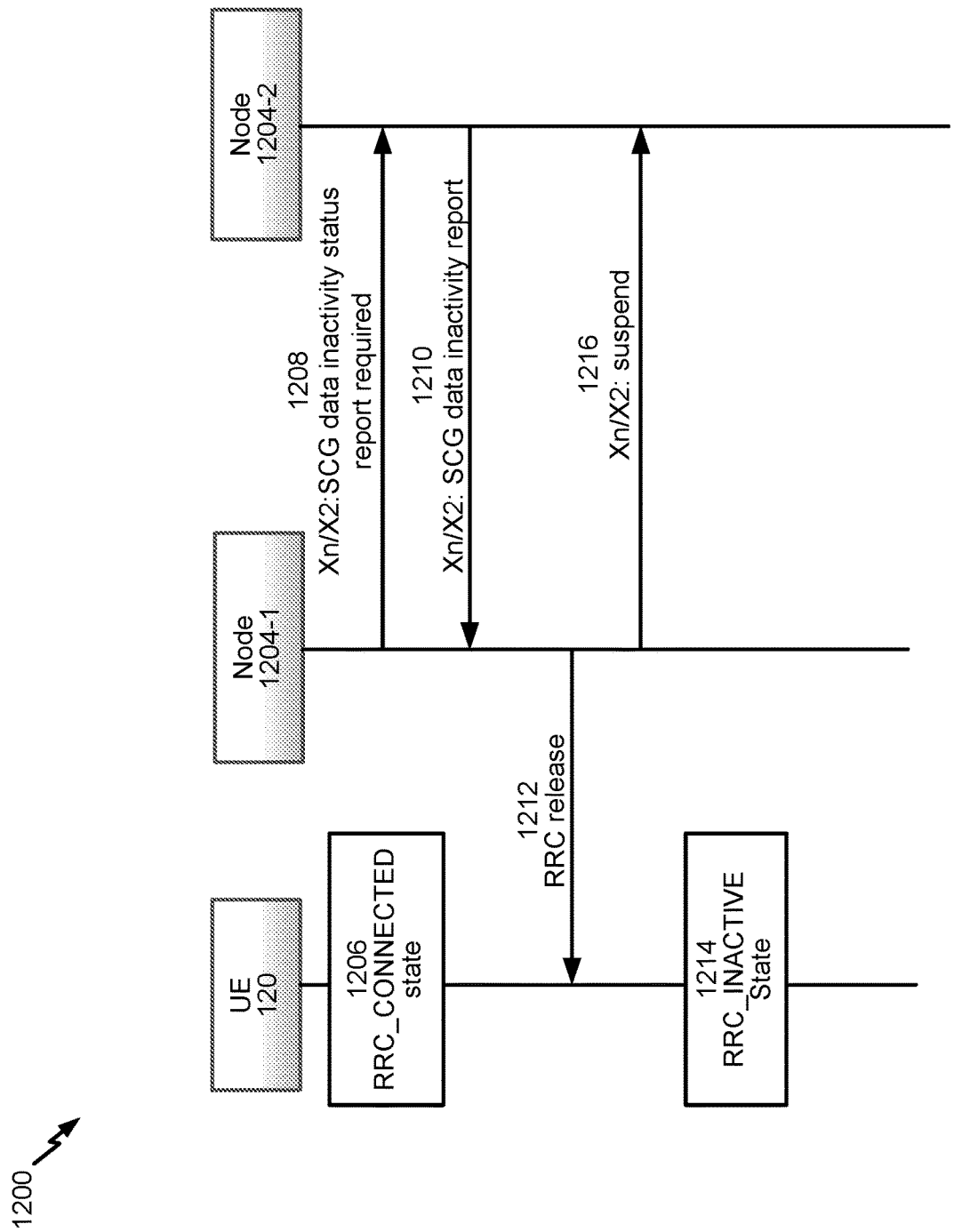
FIGS. 12A-12C are diagrams illustrating an example of dual-connectivity mode secondary cell group configuration, in accordance with various aspects of the present disclosure.
Figure 12B:
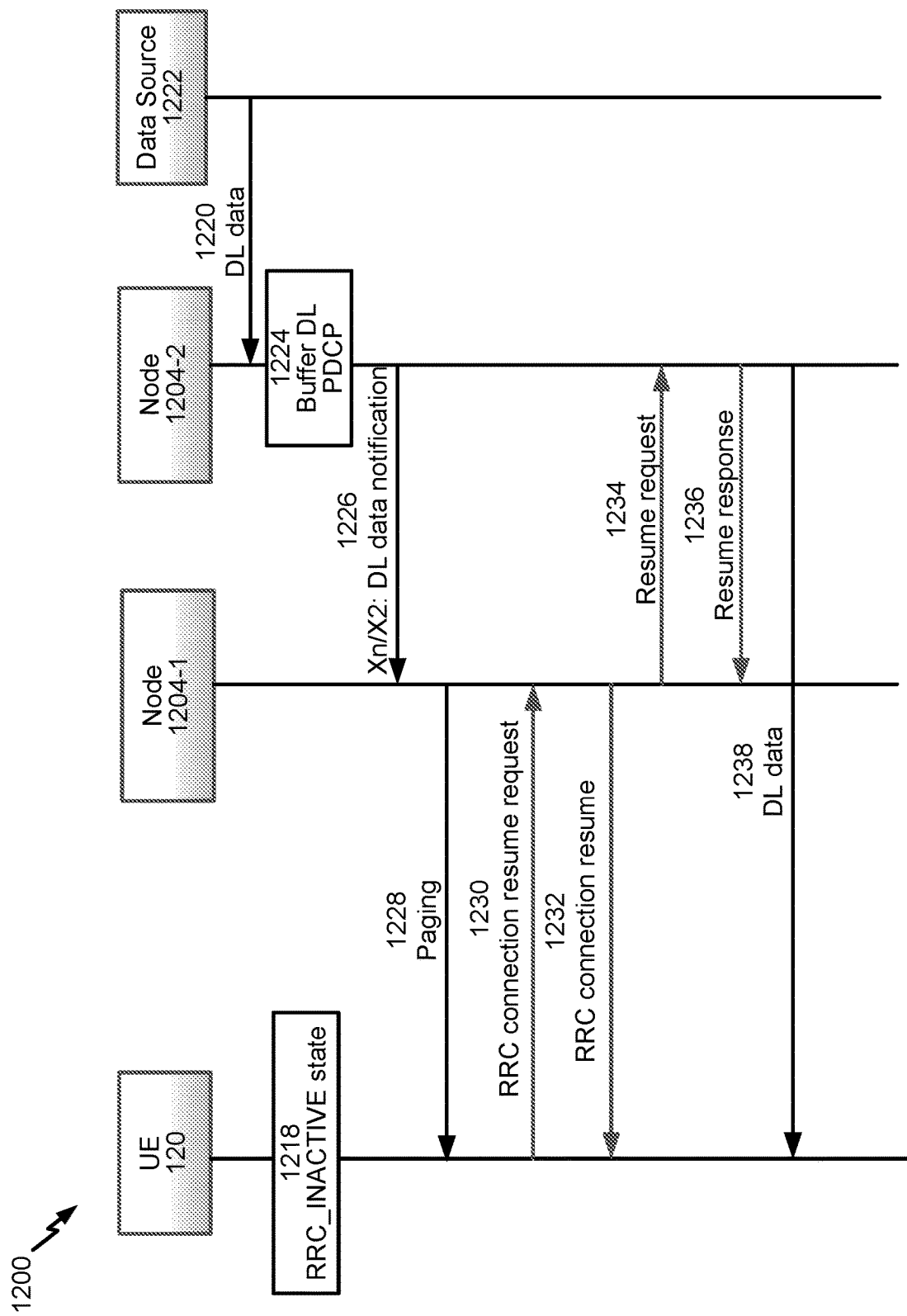
Figure 12C:
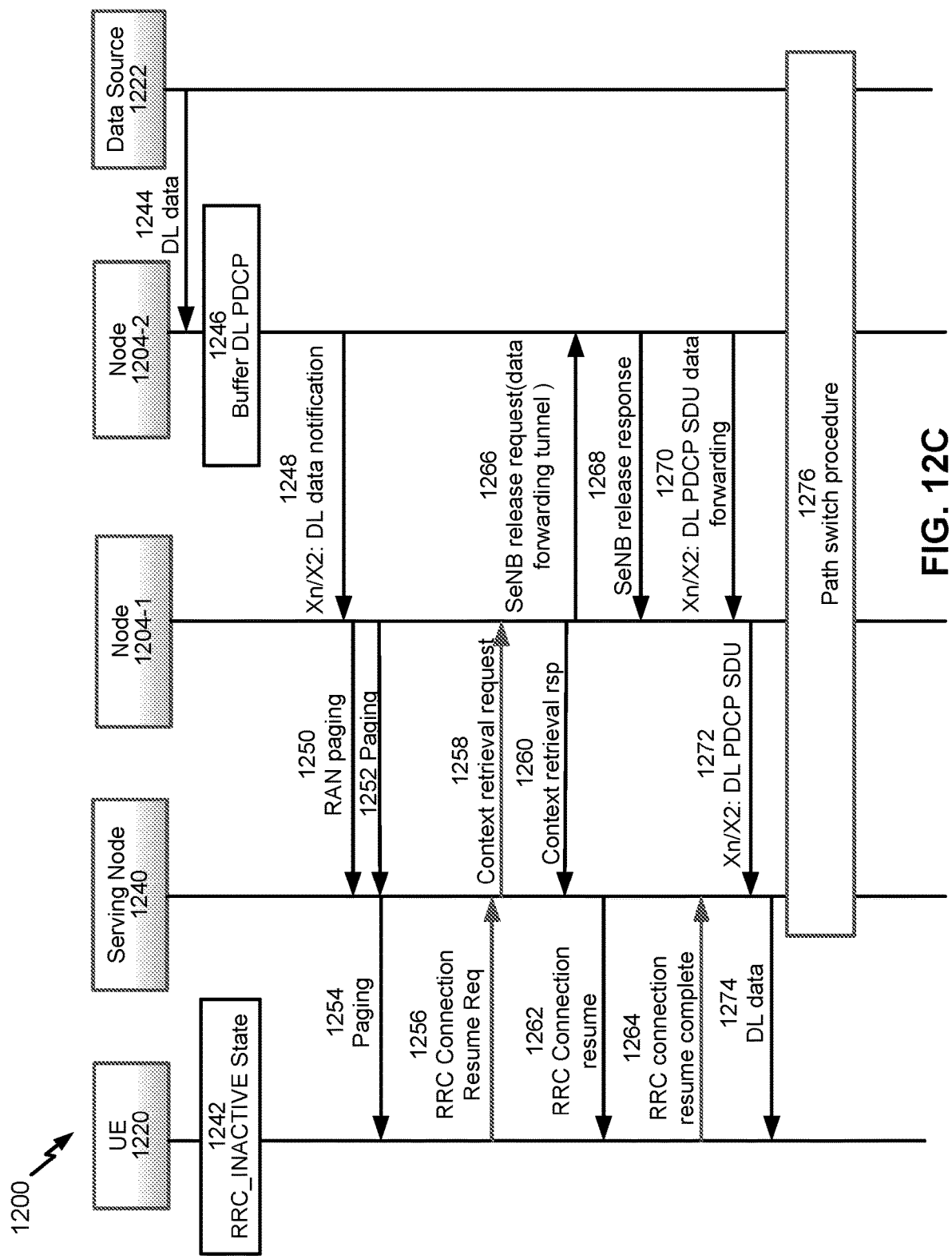

FIGS. 12A-12C are diagrams illustrating an example 1200 of dual-connectivity mode secondary cell group configuration, in accordance with various aspects of the present disclosure. As shown in FIG. 12A, example 1200 includes a UE 120; a node 1204-1 (e.g., which may correspond to BS 110), which may be a master node; and a node 1204-2 (e.g., which may correspond to BS 110), which may be a secondary node.

As further shown in FIG. 12A, and by reference number 1206, UE 120 may operate in an RRC connected state. As shown by reference numbers 1208 and 1210, node 1204-1 and node 1204-2 may exchange Xn/X2 SCG data inactivity status report request/response messages. As shown by reference number 1212, based at least in part on the response message, node 1204-1 may transmit an RRC release message to UE 120 to cause UE 120 to transition to the RRC inactive state, as shown by reference number 1214. As shown by reference number 1216, node 1204-1 may transmit an Xn/X2 suspend message to reconfigure an SCG bearer associated with node 1204-2 and UE 120. For example, node 1204-1 may cause node 1204-2 to suspend the SCG bearer. In this case, the Xn/X2 suspend message may indicate that UE 120 is transitioning to the RRC inactive state, and may trigger node 1204-2 to provide a downlink data indicator to node 1204-1 based at least in part on node 1204-2 receiving downlink data for UE 120.

As shown in FIG. 12B, and by reference number 1218, UE 120 may operate in the RRC inactive state. As shown by reference number 1220, node 1204-2 may receive downlink data from a data source 1222 for UE 120. As shown by reference numbers 1224 and 1226, based at least in part on receiving the downlink data, node 1204-2 may buffer PDCP PDUs for the downlink data and may provide a downlink data indicator (e.g., via an Xn/X2 message) to node 1204-1 to trigger paging. In this way, node 1204-1 can determine that downlink data is received at node 1204-2 for transmission to UE 120 without receiving a portion of the downlink data via an SCG split bearer and/or without reconfiguring an SCG bearer as a split bearer in connection with the transition to RRC inactive state. As shown by reference numbers 1228-1236, node 1204-1 may page UE 120 and trigger UE 120 to resume a connection with node 1204-2. As shown by reference number 1238, node 1204-2 may transmit the downlink data to UE 120 based at least in part on node 1204-1 paging UE 120 and triggering UE 120 to resume the connection with node 1204-2.

As shown in FIG. 12C, in another example wherein another node (e.g., serving node 1240) is to provide downlink data to UE 120, and by reference number 1242, UE 120 may be operating in the RRC inactive state. As shown by reference number 1244, node 1204-2 may receive downlink data from data source 1222 for UE 120. As shown by reference numbers 1246 and 1248, based at least in part on receiving the downlink data, node 1204-2 may buffer downlink PDCP PDUs and provide a downlink data notification to node 1204-1. As shown by reference numbers 1250-1254, node 1204-1 may trigger RAN paging in serving node 1240, and may perform paging for UE 120. In another example, node 1204-2 may trigger RAN paging in serving node 1240, and in node 1204-1 to initiate paging for UE 120. As shown by reference numbers 1256-1264, node 1204-1 may utilize a stored UE context for UE 120 to enable UE 120 to resume an RRC connection with serving node 1240. As shown by reference numbers 1266-1268, node 1204-1 may cause node 1204-2 to release the UE context and forward downlink data to enable UE 120 to receive the downlink data from serving node 1240. As shown by reference numbers 1270-1274, node 1204-1 may cause the downlink data to be forwarded to serving node 1240 and serving node 1240 to provide the downlink data to UE 120. As shown by reference number 1276, serving node 1240, node 1240-1, node 1240-2, and data source 1222 may perform a path switch procedure to enable subsequent downlink data to be provided for data source 1222 to serving node 1240, and from serving node 1240 to UE 120.

As indicated above, FIGS. 12A-12C are provided as examples. Other examples are possible and may differ from what was described with respect to FIGS. 12A-12C.

Figure 13:
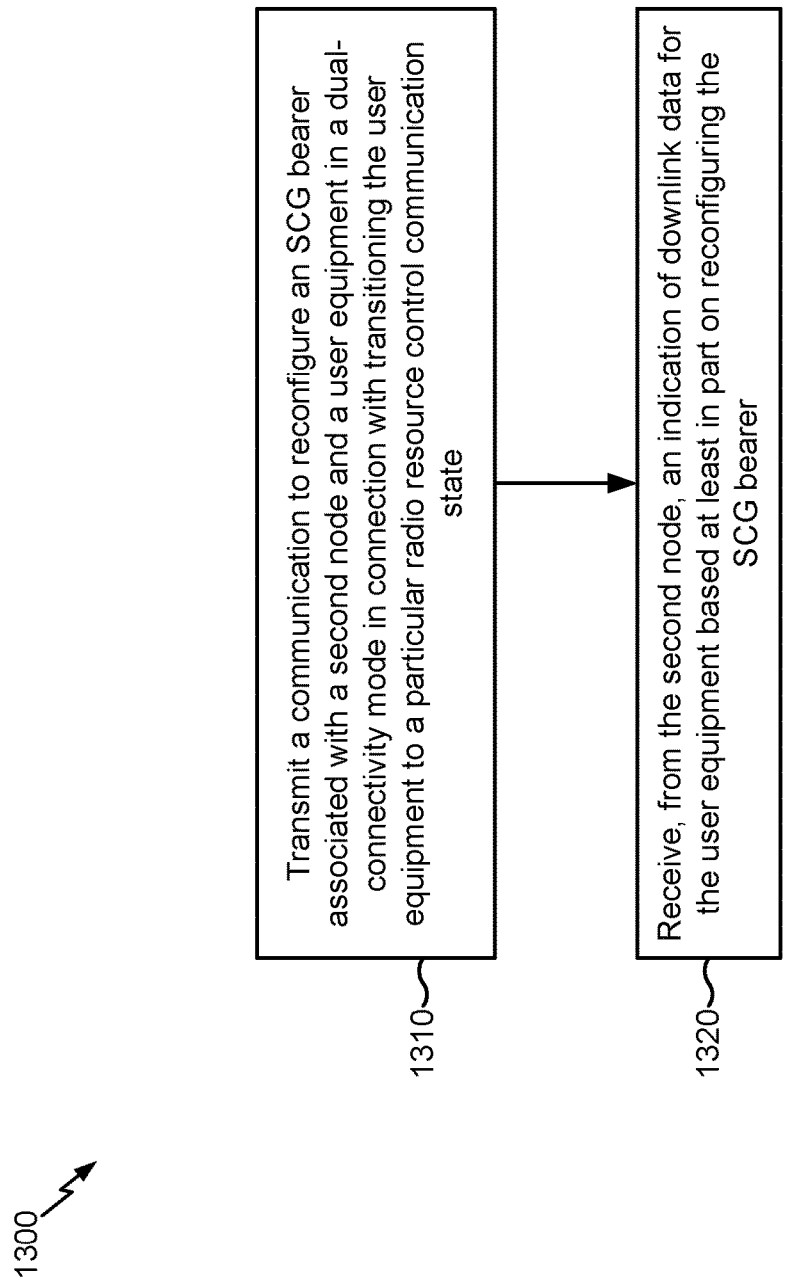
FIG. 13 is a diagram illustrating an example process performed, for example, by a base station, in accordance with various aspects of the present disclosure.

FIG. 13 is a diagram illustrating an example process 1300 performed, for example, by a base station (e.g., a first node of a set of nodes), in accordance with various aspects of the present disclosure. Example process 1300 is an example where the first node (e.g., base station 110) performs dual-connectivity mode secondary cell group configuration.

As shown in FIG. 13, in some aspects, process 1300 may include transmitting a communication to reconfigure an SCG bearer associated with a second node and a user equipment in a dual-connectivity mode in connection with transitioning the user equipment to a particular radio resource control communication state (block 1310). For example, the first node (e.g., using controller/processor 240, transmit processor 220, TX MIMO processor 230, MOD 232, antenna 234, and/or the like), which may be a master node, may transmit the communication to the second node, which may be a secondary node, to reconfigure the SCG bearer. In some aspects, the second node may be configured to store a user equipment context in connection with the user equipment operating in the particular radio resource control communication state.

In some aspects, the SCG bearer is reconfigured from the SCG bearer to an SCG split bearer. In some aspects, the reconfiguration of the SCG bearer is a one-step radio resource control message transmission or a two-step radio resource control message exchange. In some aspects, the user equipment is transitioned to the particular radio resource control communication state based at least in part on an inactivity status report received from the second node.

In some aspects, the transmitting the communication to reconfigure is performed before the user equipment transitions to the particular radio resource control communication state. In some aspects, the particular radio resource control communication state is one of an inactive state, a light connection state, or a semi-connected state. In some aspects, the SCG bearer is reconfigured at the second node such that the second node provides downlink data to the first node for radio access network paging.

In some aspects, the user equipment is transitioned to the particular radio resource control communication state without reconfiguring the SCG bearer to an SCG split bearer. In some aspects, an indication that the user equipment is in the particular radio resource control communication state causes the second node to suspend at least one SCG split bearer or at least one SCG bearer.

As further shown in FIG. 13, in some aspects, process 1300 may include receiving, from the second node, an indication of downlink data for the user equipment based at least in part on reconfiguring the SCG bearer (block 1320). For example, the first node (e.g., using antenna 234, DEMOD 232, MIMO detector 236, receive processor 238, controller/processor 240, and/or the like) may receive the indication of downlink data for the user equipment, and may initiate paging for the user equipment, based at least in part on reconfiguring the SCG bearer.

In some aspects, the indication of the downlink data is a subset of the downlink data. In some aspects, the user equipment is paged by the first node based at least in part on the indication of the downlink data. In some aspects, the user equipment context is used to transition the user equipment from the particular radio resource control communication state to another radio resource control state.

In some aspects, at least a portion of the downlink data is provided from the first node to the user equipment. In some aspects, the downlink data is buffered by the first node. In some aspects, at least a portion of the downlink data is provided from the second node to the first node.

In some aspects, the first node reconfigures the SCG bearer to cause at least a portion of the downlink data to be provided from the second node to the user equipment directly via an air interface. In some aspects, a downlink data indicator is received from the second node. In some aspects, the SCG reconfiguration causes downlink data to be buffered by the second node. In some aspects, another communication is transmitted to cause resumption of SCG data from the second node to the user equipment in connection with entering another radio resource control communication state.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
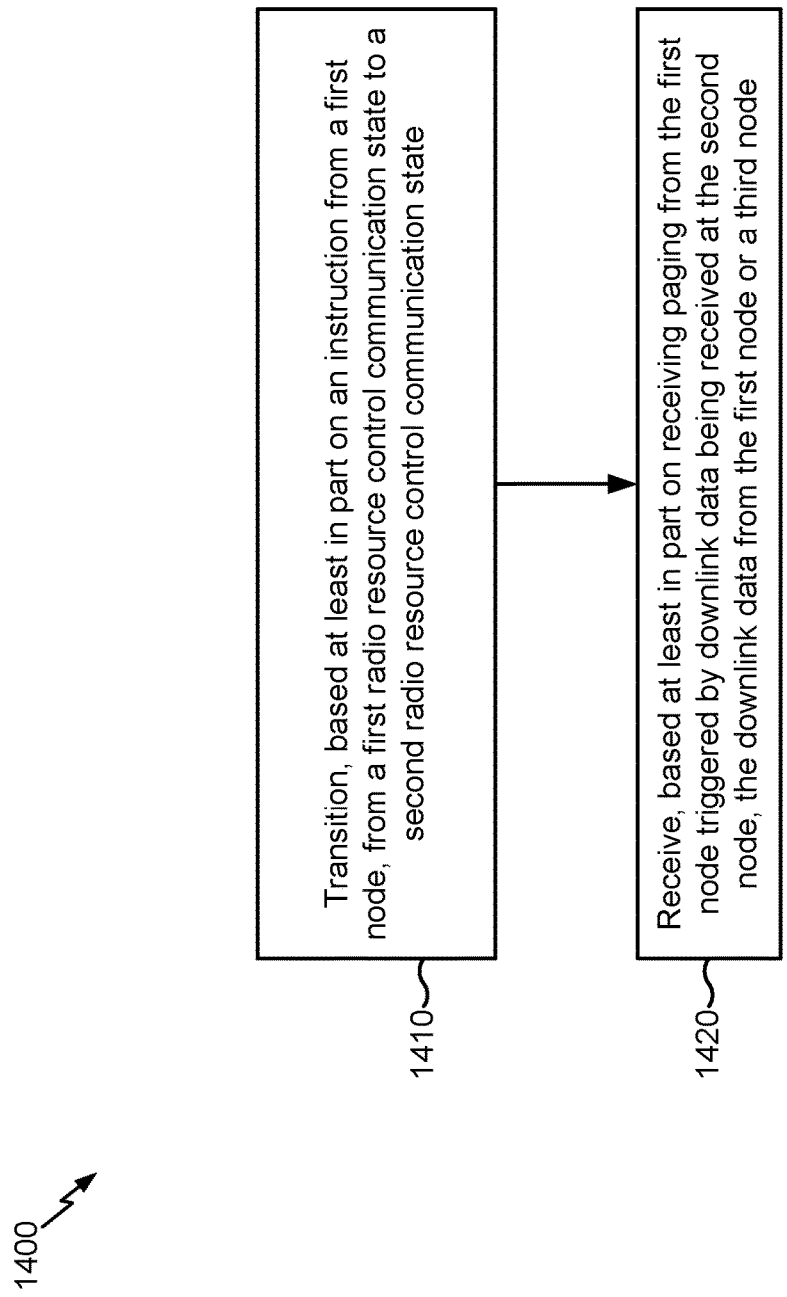
FIG. 14 is a diagram illustrating an example process performed, for example, by a user equipment, in accordance with various aspects of the present disclosure.

FIG. 14 is a diagram illustrating an example process 1400 performed, for example, by a user equipment, in accordance with various aspects of the present disclosure. Example process 1400 is an example where the user equipment (e.g., UE 120) performs dual-connectivity mode secondary cell group configuration.

As shown in FIG. 14, in some aspects, process 1400 may include transitioning, based at least in part on an instruction from a first node, from a first radio resource control communication state to a second radio resource control communication state (block 1410). For example, the user equipment (e.g., using controller/processor 280, transmit processor 264, TX MIMO processor 266, MOD 254, antenna 252, DEMOD 254, MIMO detector 256, receive processor 258, and/or the like) may, when connected to a second node using a secondary cell group (SCG) bearer in a dual-connectivity mode, transition from a radio resource control connected state to a radio resource control inactive state, wherein the user equipment stores a user equipment context and controls mobility for the user equipment.

As further shown in FIG. 14, in some aspects, process 1400 may include receiving, based at least in part on receiving paging from the first node triggered by downlink data being received at the second node, the downlink data from the first node or a third node (block 1420). For example, the user equipment (e.g., using antenna 252, DEMOD 254, MIMO detector 256, receive processor 258, controller/processor 280, and/or the like) may receive paging to resume a connection using the user equipment context, may resume the connection, and may receive the downlink data from the first node, from a serving node, and/or the like based at least in part on resuming the connection. In some aspects, the SCG bearer is reconfigured to an SCG split bearer associated with the user equipment, the first node, and the second node based at least in part on receiving the instruction from the first node. In some aspects, the paging is received without the SCG bearer being reconfigured to an SCG split bearer.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
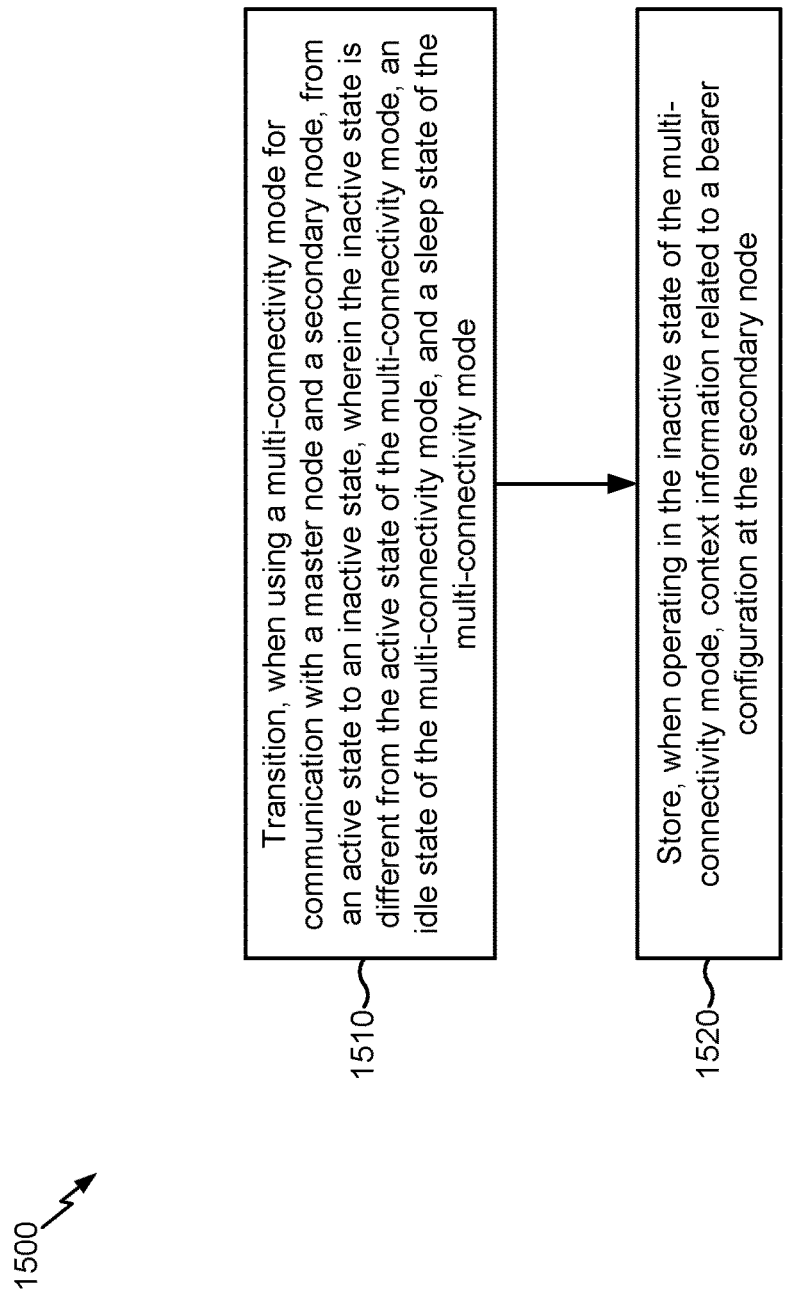
FIG. 15 is a diagram illustrating an example process performed, for example, by a user equipment, in accordance with various aspects of the present disclosure.

FIG. 15 is a diagram illustrating an example process 1500 performed, for example, by a UE, in accordance with various aspects of the present disclosure. Example process 1500 is an example where a UE (e.g., UE 120) enables UE mobility in a multi-connectivity mode.

As shown in FIG. 15, in some aspects, process 1500 may include transitioning, when using a multi-connectivity mode for communication with a master node and a secondary node, from an active state to an inactive state, wherein the inactive state is different from the active state of the multi-connectivity mode, an idle state of the multi-connectivity mode, and a sleep state of the multi-connectivity mode (block 1510). For example, the UE (e.g., using controller/processor 280 and/or the like) may transition when using the multi-connectivity mode for communication with the master node and the secondary node, from the active state to the inactive state, as described above. In some aspects, the inactive state is different from the active state, the idle state, and the sleep state.

As shown in FIG. 15, in some aspects, process 1500 may include storing, when operating in the inactive state of the multi-connectivity mode, context information related to a bearer configuration at the secondary node (block 1520). For example, the UE (e.g., using controller/processor 280, memory 282) may store, when operating in the inactive state of the multi-connectivity mode, context information related to the bearer configuration at the secondary node, as described above.

Process 1500 may include additional aspects, such as any single aspect or any combination of aspects described below and/or in connection with one or more other processes described elsewhere herein.

In some aspects, the UE may select at least one target node for a radio resource control connection, wherein the UE is in the inactive state when the at least one target node is selected, and may transmit information to the at least one target node or the master node to cause the context information to be provided to the at least one target node. In some aspects, the at least one target node is a new secondary node with regard to a multi-connectivity configuration of the UE, and the UE may send an identifier of the new secondary node to the master node to cause the context information to be provided to the at least one target node.

In some aspects, the at least one target node is a new secondary node with regard to a multi-connectivity configuration of the UE, and is selected from a set of nodes associated with a radio access network (RAN) paging area of the UE, and the transmitting of the information to the at least one target node causes a context fetch of the context information by the new secondary node from the secondary node. In some aspects, the at least one target node includes a new master node or a new secondary node with regard to a multi-connectivity configuration of the UE. In some aspects, prior to the selection of the at least one target node, the UE enters the inactive state based at least in part on a command from the master node.

In some aspects, the UE is configured to release a secondary cell group (SCG) associated with the secondary node based at least in part on establishing the radio resource control connection with the at least one target node. In some aspects, the UE is configured to send information identifying the at least one target node to the master node. In some aspects, the at least one target node is a new secondary node, and wherein the information identifying the at least one target node is sent before the UE transitions to a connected mode.

In some aspects, the information identifying the at least one target node includes a channel quality measurement for the at least one target node. In some aspects, the at least one target node is the secondary node. In some aspects, the UE may transmit a notification to the secondary node after the UE enters the inactive state.

In some aspects, the UE is configured to release a secondary cell group (SCG) associated with the secondary node based at least in part on a channel quality associated with the secondary node. In some aspects, the UE is configured to release the SCG based at least in part on a threshold specified by the master node. In some aspects, the UE is configured to release a secondary cell group (SCG) associated with the secondary node upon change of a radio access network (RAN) paging area of the UE.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
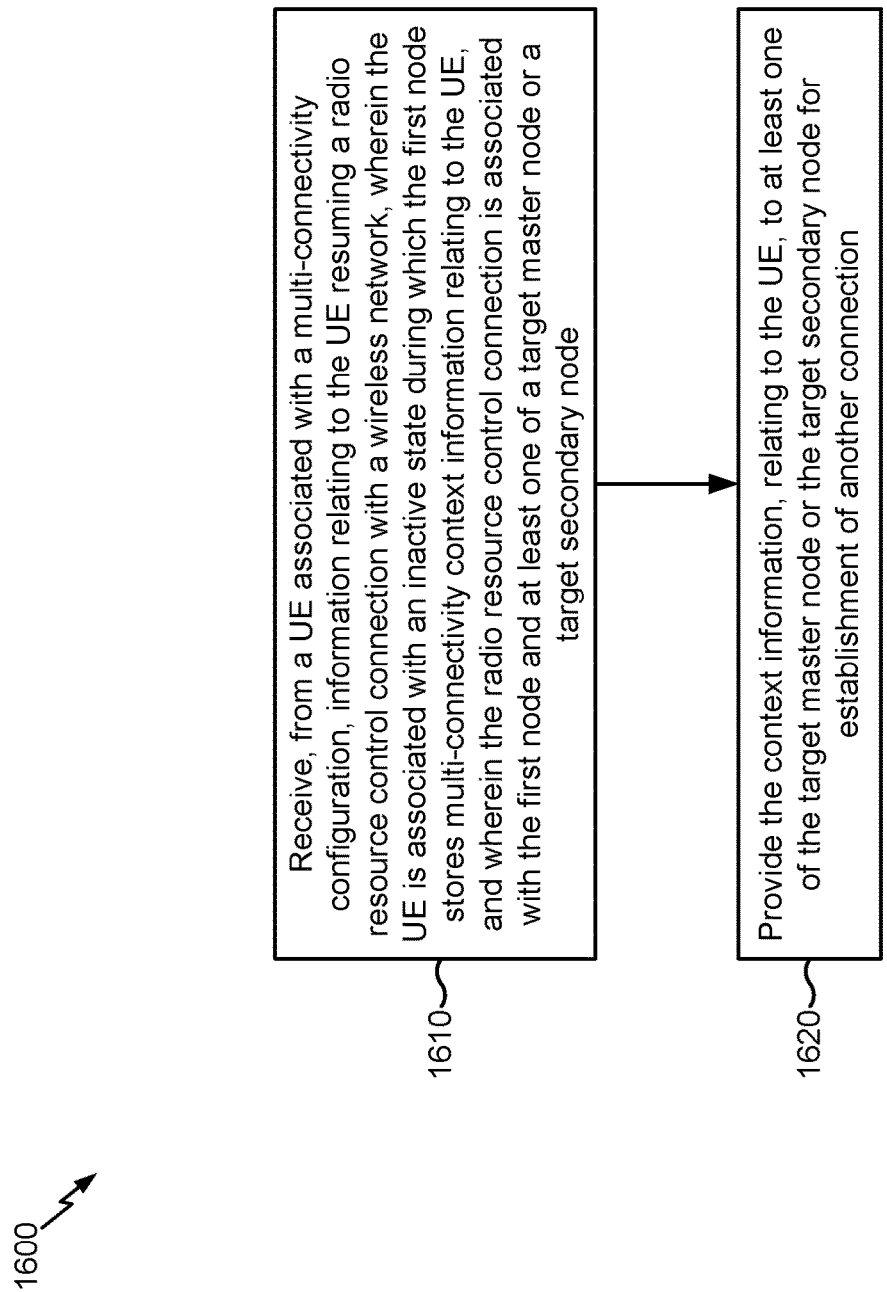
FIG. 16 is a diagram illustrating an example process performed, for example, by a node, in accordance with various aspects of the present disclosure.

FIG. 16 is a diagram illustrating an example process 1600 performed, for example, by a first node, in accordance with various aspects of the present disclosure. Example process 1600 is an example where a first node (e.g., BS 110) enables UE mobility in a multi-connectivity mode.

As shown in FIG. 16, in some aspects, process 1600 may include receiving, from a UE associated with a multi-connectivity configuration, information relating to the UE resuming a radio resource control connection with a wireless network, wherein the UE is associated with an inactive state during which the first node stores multi-connectivity context information relating to the UE, and wherein the radio resource control connection is associated with the first node and at least one of a target master node or a target secondary node (block 1610). For example, the first node (e.g., using antenna 234, DEMOD 232, MIMO detector 236, receive processor 238, controller/processor 240, and/or the like) may receive from the UE associated with a multi-connectivity configuration, information relating to the UE resuming the radio resource control connection with a wireless network, as described above. In some aspects, the UE is associated with the inactive state during which the first node stores multi-connectivity context information relating to the UE. In some aspects, the radio resource control connection is associated with the target master node and the target secondary node.

As shown in FIG. 16, in some aspects, process 1600 may include providing the context information, relating to the UE, to at least one of the target master node or the target secondary node for establishment of another connection (block 1620). For example, the first node (e.g., using controller/processor 240, transmit processor 220, TX MIMO processor 230, MOD 232, antenna 234, and/or the like) may provide the context information, relating to the UE, to at least one of the target master node or the target secondary node for establishment of another connection (e.g., a connection with another node in the multi-connectivity mode), as described above.

Process 1600 may include additional aspects, such as any single aspect or any combination of aspects described below and/or in connection with one or more other processes described elsewhere herein.

In some aspects, the first node may configure a radio bearer associated with the UE based at least in part on a configuration of the target master node or the target secondary node. In some aspects, the first node is a master node of the UE to which the UE connected prior to the UE connecting to the target master node. In some aspects, the first node may receive information indicating that a backhaul connection has been configured between the target master node and the target secondary node.

In some aspects, the first node is configured to release a backhaul connection with a particular secondary node of the UE to which the UE is connected when information identifying the target secondary node is received. In some aspects, the first node may provide information identifying the target secondary node to a particular secondary node to which the UE is connected or has previously been connected, to cause the particular secondary node to provide the context information or buffered data stored by the particular secondary node. In some aspects, the first node is the target master node.

In some aspects, the first node is configured to provide an instruction to cause the UE to enter the inactive state. In some aspects, the first node is configured to suspend an interface between the first node and a secondary node of the UE while the UE is in the inactive state. In some aspects, the first node is configured to provide the instruction based at least in part on a confirmation from a secondary node of the UE that the instruction is to be provided.

In some aspects, the first node is configured to provide information to a secondary node that the UE has entered the inactive state. In some aspects, the first node is configured to identify a set of nodes of a radio access network (RAN) paging area associated with the UE, the set of nodes including at least one of the target master node or the target secondary node. In some aspects, the first node is configured to provide information identifying the set of nodes to the UE. In some aspects, the target master node is selected from a first set of nodes of a first radio access network (RAN) paging area and the target secondary node is selected from a second set of nodes of a second RAN paging area.

In some aspects, the first node may receive information identifying the target secondary node, wherein the first node is configured to provide the context information to the target secondary node based at least in part on receiving the information identifying the target secondary node. In some aspects, the first node may receive information identifying the target secondary node, wherein the first node is configured to provide the information identifying the target secondary node to a secondary node with which the UE was previously connected.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
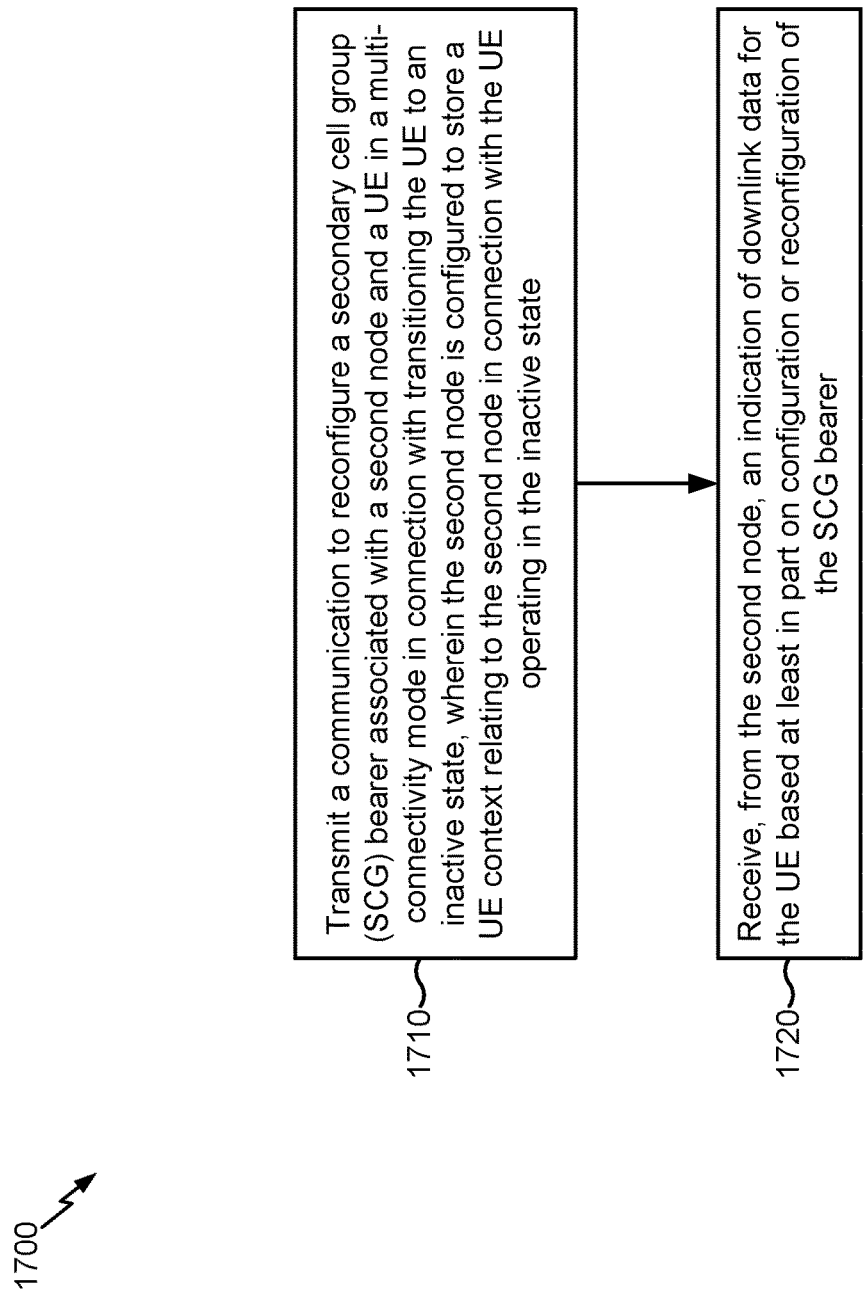
FIG. 17 is a diagram illustrating an example process performed, for example, by a node, in accordance with various aspects of the present disclosure.

FIG. 17 is a diagram illustrating an example process 1700 performed, for example, by a first node, in accordance with various aspects of the present disclosure. Example process 1700 is an example where a first node (e.g., BS 110) enables UE mobility in a multi-connectivity mode.

As shown in FIG. 17, in some aspects, process 1700 may include transmitting a communication to reconfigure a secondary cell group (SCG) bearer associated with a second node and a UE in a multi-connectivity mode in connection with transitioning the UE to an inactive state, wherein the second node is configured to store a UE context relating to the second node in connection with the UE operating in the inactive state (block 1710). For example, the first node (e.g., using controller/processor 240, transmit processor 220, TX MIMO processor 230, MOD 232, antenna 234, and/or the like) may transmit the communication to reconfigure the SCG bearer associated with the second node and the UE in the multi-connectivity mode in connection with transitioning the UE to an inactive state, as described above. In some aspects, the second node is configured to store the UE context relating to the second node in connection with the UE operating in the inactive state.

As shown in FIG. 17, in some aspects, process 1700 may include receiving, from the second node, an indication of downlink data for the UE based at least in part on configuration or reconfiguration of the SCG bearer (block 1720). For example, the first node (e.g., using antenna 234, DEMOD 232, MIMO detector 236, receive processor 238, controller/processor 240, and/or the like) may receive, from the second node, the indication of downlink data for the UE based at least in part on configuration or reconfiguration of the SCG bearer, as described above.

Process 1700 may include additional aspects, such as any single aspect or any combination of aspects described below and/or in connection with one or more other processes described elsewhere herein.

In some aspects, the UE is transitioned to the inactive state based at least in part on an inactivity status report received from the second node. In some aspects, the transmitting the communication to reconfigure is performed before the UE transitions to the inactive state. In some aspects, the SCG bearer is configured or reconfigured at the second node such that the second node provides downlink data to the first node for radio access network paging. In some aspects, the indication of the downlink data is a subset of the downlink data.

In some aspects, the UE is paged by the first node based at least in part on the indication of the downlink data. In some aspects, the UE context is used to transition the UE from the inactive state to an active state or a sleep state. In some aspects, at least a portion of the downlink data is provided from the first node to the UE. In some aspects, the downlink data is buffered by the first node. In some aspects, at least a portion of the downlink data is received at the first node from the second node.

In some aspects, the first node reconfigures the SCG bearer to cause at least a portion of the downlink data to be provided from the second node to the UE directly via an air interface. In some aspects, a downlink data indicator is received from the second node. In some aspects, the UE is transitioned to the inactive state without reconfiguring the SCG bearer to an SCG split bearer.

In some aspects, an indication that the UE is in the inactive state is operative to cause the second node to suspend at least one SCG split bearer or at least one SCG bearer. In some aspects, the SCG reconfiguration is operative to cause downlink data to be buffered by the second node. In some aspects, another communication is transmitted to cause resumption of SCG data from the second node to the UE in connection with entering another inactive state.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
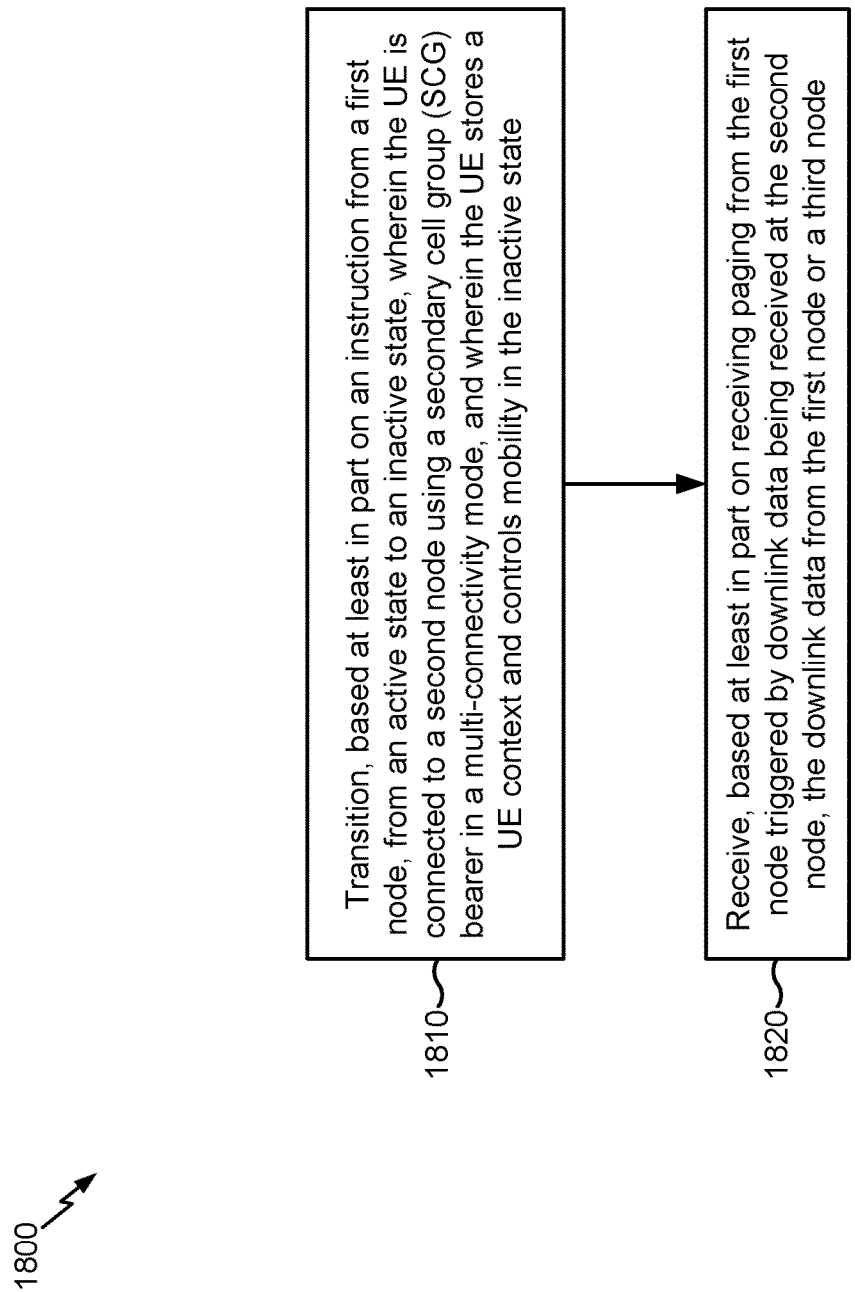
FIG. 18 is a diagram illustrating an example process performed, for example, by a node, in accordance with various aspects of the present disclosure.

FIG. 18 is a diagram illustrating an example process 1800 performed, for example, by a UE, in accordance with various aspects of the present disclosure. Example process 1800 is an example where a UE (e.g., UE 120) enables UE mobility in a multi-connectivity mode.

As shown in FIG. 18, in some aspects, process 1800 may include transitioning, based at least in part on an instruction from a first node, from an active state to an inactive state, wherein the UE is connected to a second node using a secondary cell group (SCG) bearer in a multi-connectivity mode, and wherein the UE stores a UE context and controls mobility in the inactive state (block 1810). For example, the UE (e.g., using controller/processor 280 and/or the like) may transition, based at least in part on the instruction from the first node, from the active state to the inactive state, as described above. In some aspects, the UE is connected to the second node using the SCG bearer in the multi-connectivity mode. In some aspects, the UE stores the UE context and controls mobility in the inactive state.

As shown in FIG. 18, in some aspects, process 1800 may include receiving, based at least in part on receiving paging from the first node triggered by downlink data being received at the second node, the downlink data from the first node or a third node (block 1820). For example, the UE (e.g., using antenna 252, DEMOD 254, MIMO detector 256, receive processor 258, controller/processor 280, and/or the like) may receive, based at least in part on receiving paging from the first node triggered by downlink data being received at the second node, the downlink data from the first node or the third node, as described above.

Process 1800 may include additional aspects, such as any single aspect or any combination of aspects described below and/or in connection with one or more other processes described elsewhere herein.

In some aspects, the SCG bearer is reconfigured to an SCG split bearer associated with the UE, the first node, and the second node based at least in part on receiving the instruction from the first node. In some aspects, the paging is received without the SCG bearer being reconfigured to an SCG split bearer.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
 a memory;
 one or more processors, coupled to the memory, configured to:
  receive a radio resource control (RRC) release message to transition the UE from a first RRC state to an RRC inactive state, the RRC inactive state being a state where an RRC connection is suspended, which is different from an RRC idle state where no RRC connection is established;
  transition to the RRC inactive state; and
  transmit a resume message to one or more network nodes, the resume message identifying one or more target nodes to which UE context information is to be transferred to establish an RRC connection with the one or more target nodes based at least in part on the UE context information, the UE supporting multi-connectivity operation.

2. The UE of claim 1, wherein the UE context information comprises RRC configuration information associated with the UE.

3. The UE of claim 2, wherein the configuration information comprises a security parameter relating to transitioning the UE from the RRC inactive state to the first RRC state.

4. The UE of claim 1, wherein the one or more processors are further configured to:

transmit information to at least one target node or a master node to cause the UE context information to be provided to the at least one target node.

5. The UE of claim 4, wherein the at least one target node is a new secondary node with regard to a multi-connectivity configuration of the UE, and is selected from a set of nodes associated with a radio access network (RAN) paging area of the UE; and
wherein the transmitting of the information to the at least one target node causes a context fetch of the UE context information.

6. The UE of claim 1, wherein the UE context information is stored based at least in part on the UE operating in the RRC inactive state.

7. The UE of claim 1, wherein the one or more processors are further configured to:
receive, based at least in part on paging from a master node when in the RRC inactive state, downlink data from the master node.

8. A method of wireless communication performed by a user equipment (UE), comprising:
receiving a radio resource control (RRC) release message to transition the UE from a first RRC state to an RRC inactive state, the RRC inactive state being a state where an RRC connection is suspended, which is different from an RRC idle state where no RRC connection is established;
transitioning to the RRC inactive state; and
transmitting a resume message to one or more network nodes, the resume message identifying one or more target nodes to which UE context information is to be transferred to establish an RRC connection with the one or more target nodes based at least in part on the UE context information, the UE supporting multi-connectivity operation.

9. The method of claim 8, wherein the UE context information comprises RRC configuration information associated with the UE.

10. The method of claim 9, wherein the configuration information comprises a security parameter relating to transitioning the UE from the RRC inactive state to the first RRC state.

11. The method of claim 8, further comprising:
selecting at least one target node for a radio resource control connection,
wherein the UE is in the RRC inactive state when the at least one target node is selected; and
transmitting information to the at least one target node or a master node to cause the UE context information to be provided to the at least one target node.

12. The method of claim 11, wherein the at least one target node is a new secondary node with regard to a multi-connectivity configuration of the UE, and is selected from a set of nodes associated with a radio access network (RAN) paging area of the UE; and
wherein the transmitting of the information to the at least one target node causes a context fetch of the UE context information.

13. The method of claim 8, wherein the UE context information is stored based at least in part on the UE operating in the RRC inactive state.

14. The method of claim 8, further comprising:
transmitting a notification to a secondary node after the UE enters the RRC inactive state.

15. The method of claim 14, wherein the UE is configured to release a secondary cell group (SCG) associated with the secondary node based at least in part on a channel quality associated with the secondary node.

16. A network node for wireless communication, comprising:
a memory;
one or more processors, coupled to the memory, configured to:
provide information to a secondary node that a user equipment (UE) has entered a radio resource control (RRC) inactive state during which the network node stores, based at least in part on the UE being in the RRC inactive state, UE context information;
receive information relating to the UE resuming an RRC connection,
wherein the RRC connection is associated with the network node and at least one of a target master node or a target secondary node; and
provide the UE context information to at least one of the target master node or the target secondary node for establishment of another connection, the UE supporting multi-connectivity operation.

17. The network node of claim 16, wherein the UE context information comprises RRC configuration information associated with the UE.

18. The network node of claim 16, wherein the UE context information comprises a security parameter relating to transitioning the UE from the RRC inactive state to an RRC connected communication state.

19. The network node of claim 16, wherein the one or more processors are further configured to:
configure a radio bearer associated with the UE based at least in part on a configuration of the target master node or the target secondary node.

20. The network node of claim 16, wherein the one or more processors are further configured to:
provide information identifying the target secondary node to a particular secondary node to which the UE is connected or has previously been connected, to cause the particular secondary node to provide the UE context information or buffered data stored by the particular secondary node.

* * * * *